United States Patent
Nakagawa et al.

(10) Patent No.: US 10,822,531 B2
(45) Date of Patent: Nov. 3, 2020

(54) TWO-COMPONENT CURABLE SOLVENTLESS-TYPE LAMINATE ADHESIVE AND RESIN CURED PRODUCT

(71) Applicant: MITSUI CHEMICALS, INC., Tokyo (JP)

(72) Inventors: Junichi Nakagawa, Sodegaura (JP); Akihiro Imai, Chiba (JP); Kazuhiro Ando, Chiba (JP); Toshihiko Nakagawa, Ichihara (JP); Hirokazu Morita, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 119 days.

(21) Appl. No.: 16/066,197

(22) PCT Filed: Feb. 16, 2017

(86) PCT No.: PCT/JP2017/005657
§ 371 (c)(1),
(2) Date: Jun. 26, 2018

(87) PCT Pub. No.: WO2017/142008
PCT Pub. Date: Aug. 24, 2017

(65) Prior Publication Data
US 2019/0010372 A1    Jan. 10, 2019

(30) Foreign Application Priority Data

Feb. 19, 2016   (JP) .................. 2016-030406

(51) Int. Cl.
| | |
|---|---|
| *C09J 175/06* | (2006.01) |
| *C08G 18/80* | (2006.01) |
| *C08G 18/12* | (2006.01) |
| *C08G 18/32* | (2006.01) |
| *C08G 18/28* | (2006.01) |
| *C08G 18/78* | (2006.01) |
| *C08G 18/42* | (2006.01) |
| *C08G 18/46* | (2006.01) |
| *C08G 18/79* | (2006.01) |
| *C08G 18/72* | (2006.01) |
| *C08G 18/10* | (2006.01) |
| *C08G 18/73* | (2006.01) |
| *C08G 18/76* | (2006.01) |
| *C09J 5/04* | (2006.01) |

(52) U.S. Cl.
CPC ............ *C09J 175/06* (2013.01); *C08G 18/10* (2013.01); *C08G 18/12* (2013.01); *C08G 18/289* (2013.01); *C08G 18/3206* (2013.01); *C08G 18/4213* (2013.01); *C08G 18/4216* (2013.01); *C08G 18/4615* (2013.01); *C08G 18/4692* (2013.01); *C08G 18/721* (2013.01); *C08G 18/722* (2013.01); *C08G 18/73* (2013.01); *C08G 18/7642* (2013.01); *C08G 18/7837* (2013.01); *C08G 18/7843* (2013.01); *C08G 18/791* (2013.01); *C08G 18/792* (2013.01); *C08G 18/8064* (2013.01); *C09J 5/04* (2013.01); *C09J 2475/00* (2013.01)

(58) Field of Classification Search
CPC ............... C09J 175/06; C08G 18/7837; C08G 18/7843; C08G 18/722; C08G 18/791; C08G 18/792; C08G 18/4213; C08G 18/4216; C08G 18/4615; C08G 18/4692
See application file for complete search history.

(56) References Cited

U.S. PATENT DOCUMENTS

| | | |
|---|---|---|
| 6,833,044 B2 | 12/2004 | Imai et al. |
| 2009/0131603 A1 | 5/2009 | Asahina |
| 2009/0239998 A1 | 9/2009 | Asahina |
| 2014/0248497 A1 | 9/2014 | Takei et al. |

FOREIGN PATENT DOCUMENTS

| | | |
|---|---|---|
| CN | 103858180 A | 6/2014 |
| JP | 2007112936 A | 5/2007 |
| JP | 2010059362 A | 3/2010 |
| JP | 2010121011 A | 6/2010 |
| JP | 2010254764 A | 11/2010 |
| JP | 4631093 B2 | 2/2011 |
| JP | 4660677 B2 | 3/2011 |
| JP | 2011162656 A | 8/2011 |
| JP | 2013-60542 | 4/2013 |
| JP | 5253053 B2 | 7/2013 |
| JP | 2013224350 A | 10/2013 |

(Continued)

OTHER PUBLICATIONS

PCT International Preliminary Report on Patentability (Form PCT/IB/373) filed in PCT/JP2017/005657, with PCT Notification Concerning Transmittal of International Preliminary Report on Patentability (Form PCT/IB/326) dated Aug. 21, 2018.

(Continued)

*Primary Examiner* — Michael L Leonard
(74) *Attorney, Agent, or Firm* — Rankin, Hill & Clark LLP

(57) ABSTRACT

A two-component curable solventless-type laminate adhesive contains a polyisocyanate component and a polyol component. The polyisocyanate component contains a derivative of a pentamethylene diisocyanate, the derivative of the pentamethylene diisocyanate contains an isocyanurate group and an allophanate group, and the content ratio of the isocyanurate group with respect to 100 moles of the total amount of the isocyanurate group and the allophanate group is 60 moles or more and 99 moles or less.

6 Claims, No Drawings

(56) References Cited

FOREIGN PATENT DOCUMENTS

| JP | 5563843 B2 | 7/2014 |
| WO | 2007034883 A1 | 3/2007 |
| WO | 2007046470 A1 | 4/2007 |

OTHER PUBLICATIONS

PCT International Preliminary Report on Patentability (Form PCT/IB/373) filed in PCT/JP2017/005657, with PCT Notification of Transmittal of Translation of the International Preliminary Report on Patentability (Form PCT/IB/338) dated Aug. 21, 2018.
Extended European Search Report (EESR) dated Sep. 23, 2019 issued in the corresponding European patent application No. 17753263.7.
International Search Report dated Apr. 4, 2017 filed in PCT/JP2017/005657.

TWO-COMPONENT CURABLE SOLVENTLESS-TYPE LAMINATE ADHESIVE AND RESIN CURED PRODUCT

TECHNICAL FIELD

The present invention relates to a two-component curable solventless-type laminate adhesive and a resin cured product, to be specific, to a two-component curable solventless-type laminate adhesive and a resin cured product prepared by curing the two-component curable solventless-type laminate adhesive.

BACKGROUND ART

A composite film obtained by bonding various films with a laminate adhesive has been widely used in the field of packaging materials.

As the laminate adhesive used in adhesion of the composite film, a two-component curable adhesive prepared from a polyisocyanate component and a polyol component has been widely known.

As the two-component curable adhesive, for example, a two-component curable solvent-type adhesive containing an organic solvent and a two-component curable solventless-type adhesive without containing an organic solvent have been known.

With respect to the two-component curable solvent-type adhesive, the two-component curable solventless-type adhesive does not require a drying step of drying an organic solvent, so that the cost required for the drying step can be reduced, and the use of the organic solvent can be reduced, so that in view of environmental protection, resource saving can be achieved and the working environment can be improved.

As the two-component curable solventless-type adhesive, for example, one that contains a polyisocyanate component containing a diisocyanate group-terminated urethane prepolymer obtained by reaction of a diisocyanate containing an araliphatic diisocyanate and a diol containing a macrodiol, and a derivative of a hexamethylene diisocyanate, and a polyol component containing a polyurethane polyol obtained by reaction of a diol containing a macrodiol, a cross-linking polyol having three or more hydroxyl groups, and a diisocyanate has been proposed (ref: for example, Patent Document 1).

CITATION LIST

Patent Document

Patent Document 1: Japanese Unexamined Patent Publication No. 2010-59362

SUMMARY OF THE INVENTION

Problem to be Solved by the Invention

In view of processability, the two-component curable solventless-type adhesive should have low viscosity immediately after mixture of the polyisocyanate component and the polyol component, and have a longer pot life until application to a film. Furthermore, in view of continuous application and laminating properties, the two-component curable solventless-type adhesive is required to develop an excellent adhesive force immediately after the application to the film.

That is, in the case of the continuous application and lamination, the two-component curable solventless-type adhesive does not contain a solvent, so that the viscosity of the solid content is required to be suppressed relatively low, while the two-component curable solvent-type adhesive contains a solvent, so that the viscosity of the solid content can be relatively increased and an initial cohesive force can be increased.

Then, in the case of the continuous application and lamination, the two-component curable solventless-type adhesive relatively has a small initial cohesive force, so that there is a disadvantage that delamination (interlayer exfoliation) occurs from the end portion of a laminate product (composite film) in a tunnel shape or the adhesive surface of a wound composite film deviates. That is, the adhesive strength of the composite film may be insufficient.

An object of the present invention is to provide a two-component curable solventless-type laminate adhesive capable of improving continuous application and laminating properties, and a resin cured product prepared by curing the two-component curable solventless-type laminate adhesive.

That is, an object of the present invention is to provide a two-component curable solventless-type laminate adhesive having excellent processability because of low viscosity of a liquid mixture immediately after mixture of a polyisocyanate component and a polyol component and a long pot life thereof, having a prompt adhesive force after application of the liquid mixture, and also having excellent continuous application and laminating properties, and a resin cured product thereof.

Also, an object of the present invention is to provide a two-component curable solventless-type laminate adhesive having the same sufficient content resistance as that of Patent Document 1, and a resin cured product thereof.

Means for Solving the Problem

The present invention [1] includes a two-component curable solventless-type laminate adhesive containing a polyisocyanate component and a polyol component, wherein the polyisocyanate component contains a derivative of a pentamethylene diisocyanate, the derivative of the pentamethylene diisocyanate contains an isocyanurate group and an allophanate group, and the content ratio of the isocyanurate group with respect to 100 moles of the total amount of the isocyanurate group and the allophanate group is 60 moles or more and 99 moles or less.

The present invention [2] includes the two-component curable solventless-type laminate adhesive described in the above-described [1], wherein the allophanate group is derived from the pentamethylene diisocyanate and a monohydric alcohol.

The present invention [3] includes the two-component curable solventless-type laminate adhesive described in the above-described [1] or [2], wherein the content ratio of the isocyanurate group with respect to 100 moles of the total amount of the isocyanurate group and the allophanate group is 90 moles or more and 98 moles or less.

The present invention [4] includes the two-component curable solventless-type laminate adhesive described in any one of the above-described [1] to [3], wherein the polyisocyanate component contains a diisocyanate group-terminated prepolymer that is a reaction product of a diisocyanate containing an araliphatic diisocyanate and a diol containing a high molecular weight diol having a number average molecular weight of 300 or more and 2000 or less.

The present invention [5] includes the two-component curable solventless-type laminate adhesive described in any one of the above-described [1] to [4], wherein the viscosity thereof at 70° C. in 2 minutes after mixture of the polyisocyanate component and the polyol component is 400 mPa·s or more and 1600 mPa·s or less.

The present invention [6] includes the two-component curable solventless-type laminate adhesive described in any one of the above-described [1] to [5], wherein the viscosity thereof at 70° C. in 20 minutes after mixture of the polyisocyanate component and the polyol component is 4000 mPa·s or less.

The present invention [7] includes a resin cured product being a cured product of the two-component curable solventless-type laminate adhesive described in any one of the above-described [1] to [6].

Effect of the Invention

The two-component curable solventless-type laminate adhesive of the present invention contains the polyisocyanate component and the polyol component, the polyisocyanate component contains the derivative of the pentamethylene diisocyanate, the derivative of the pentamethylene diisocyanate contains the isocyanurate group and the allophanate group, and the content ratio of the isocyanurate group with respect to 100 moles of the total amount of the isocyanurate group and the allophanate group is 60 moles or more and 99 moles or less.

Thus, the two-component curable solventless-type laminate adhesive of the present invention has low viscosity immediately after the mixture of the polyisocyanate component and the polyol component, and is capable of retaining the pot life long until application to an adherend and capable of improving the adhesive strength developed immediately after the application to the adherend, so that continuous application and laminating properties can be improved.

The resin cured product of the present invention is obtained from the above-described two-component curable solventless-type laminate adhesive, so that it has an excellent adhesive strength.

DESCRIPTION OF EMBODIMENTS

A two-component curable solventless-type laminate adhesive of the present invention is prepared as a two-component curable solventless-type adhesive in which an organic solvent and water are not contained, and a polyisocyanate component and a polyol component are individually prepared to be blended at the time of the use thereof.

That is, the two-component curable solventless-type laminate adhesive of the present invention contains a polyisocyanate component and a polyol component.

The polyisocyanate component does not substantially contain a solvent such as organic solvent and water, that is, substantially has the solid content of 100% and contains a derivative of a pentamethylene diisocyanate (derivative composition of a pentamethylene diisocyanate). Not substantially containing a solvent allows containing an unavoidable solvent such as solvent of a catalyst and solvent of an additive at a ratio of, for example, 0.5 mass % or less.

By containing the derivative of the pentamethylene diisocyanate as the polyisocyanate component, an excellent adhesive force can be developed immediately after application to an adherend (film).

Examples of the pentamethylene diisocyanate include 1,2-pentamethylene diisocyanate, 1,3-pentamethylene diisocyanate, 1,4-pentamethylene diisocyanate, 1,5-pentamethylene diisocyanate, 2,3-pentamethylene diisocyanate, and 2,4-pentamethylene diisocyanate or a mixture thereof. Preferably, a 1,5-pentamethylene diisocyanate is used.

In the following, in the present invention, the pentamethylene diisocyanate (hereinafter, may be abbreviated as PDI) is the 1,5-pentamethylene diisocyanate unless otherwise stated.

The pentamethylene diisocyanate is not particularly limited, and for example, can be produced in conformity with Example 1 in the description of International Patent Publication No. 2012/121291.

The derivative of the pentamethylene diisocyanate contains an isocyanurate group and an allophanate group.

That is, in the present invention, the derivative of the pentamethylene diisocyanate is a derivative composition of the pentamethylene diisocyanate; mainly contains an isocyanurate derivative of the pentamethylene diisocyanate; and contains an allophanate-modified isocyanurate derivative of the pentamethylene diisocyanate that is a reaction product of the isocyanurate derivative of the pentamethylene diisocyanate and an alcohol (described later) and/or an allophanate derivative of the pentamethylene diisocyanate that is a reaction product of the (unreacted) pentamethylene diisocyanate and the alcohol (described later).

In the derivative of the pentamethylene diisocyanate, the content ratio of the isocyanurate group with respect to 100 moles of the total amount of the isocyanurate group and the allophanate group is 60 moles or more, preferably 80 moles or more, more preferably 85 moles or more, further more preferably 90 moles or more, particularly preferably 95 moles or more, and 99 moles or less, preferably 98 moles or less, more preferably 97 moles or less.

When the content ratio of the isocyanurate group is within the above-described range, continuous application and laminating properties can be improved, and an excellent adhesive force immediately after the application to the film can be developed.

The content ratio of the isocyanurate group can be calculated from the molar ratio of the allophanate group to the isocyanurate group of the derivative of the pentamethylene diisocyanate obtained from an NMR chart measured by a $^{13}$C-NMR method in conformity with Examples to be described later.

In the derivative of the pentamethylene diisocyanate, the content ratio of the allophanate group with respect to 100 moles of the total amount of the isocyanurate group and the allophanate group is 1 mole or more, preferably 2 moles or more, more preferably 3 moles or more, and 40 moles or less, preferably 20 moles or less, more preferably 15 moles or less, further more preferably 10 moles or less, particularly preferably 5 moles or less.

When the content ratio of the allophanate group is within the above-described range, continuous application and laminating properties can be improved, and an excellent adhesive force immediately after the application to the film can be developed.

The content ratio of the isocyanurate group can be calculated from the molar ratio of the allophanate group to the isocyanurate group of the derivative of the pentamethylene diisocyanate obtained from the NMR chart measured by the $^{13}$C-NMR method in conformity with Examples to be described later.

The derivative of the pentamethylene diisocyanate can also contain an uretdione group.

That is, the derivative composition of the pentamethylene diisocyanate can also arbitrarily contain an uretdione derivative of the pentamethylene diisocyanate in addition to the above-described isocyanurate derivative and the above-described allophanate-modified isocyanurate derivative and/or the above-described allophanate derivative.

In the derivative of the pentamethylene diisocyanate, the content ratio of the uretdione group with respect to 100 moles of the total amount of the isocyanurate group and the allophanate group is, for example, 10 moles or less, preferably 5.0 moles or less, more preferably 3.5 moles or less.

When the content ratio of the uretdione group is within the above-described range, a pot life can be prolonged, and workability can be improved.

The content ratio of the uretdione group can be calculated from the molar ratio of the uretdione group to the total amount of the isocyanurate group and the allophanate group of the derivative of the pentamethylene diisocyanate obtained from the NMR chart measured by the $^{13}$C-NMR method in conformity with Examples to be described later.

The derivative of the pentamethylene diisocyanate may contain an iminooxadiazinedione group.

In the derivative of the pentamethylene diisocyanate, the content ratio of the iminooxadiazinedione group with respect to 100 moles of the total amount of the isocyanurate group and the allophanate group is, for example, 1.0 mole or less, preferably 0.5 moles or less.

The derivative (derivative composition) of the pentamethylene diisocyanate allows an unreacted pentamethylene diisocyanate monomer to be contained at a ratio of, for example, 1.0 part by mass or less, preferably 0.5 parts by mass or less with respect to 100 parts by mass of the derivative of the pentamethylene diisocyanate.

To produce the derivative of the pentamethylene diisocyanate, an inert gas such as nitrogen is introduced to the pentamethylene diisocyanate to make an inert gas atmosphere to be thereafter subjected to isocyanurate reaction.

To be subjected to the isocyanurate reaction, an isocyanurate catalyst may be added to be heated. An isocyanurate ring can be easily formed through urethane reaction, so that preferably, an alcohol is added to first subject the pentamethylene diisocyanate and the alcohol to the urethane reaction.

Examples of the alcohol include monohydric alcohols and dihydric alcohols.

Examples of the monohydric alcohol include straight-chain monohydric alcohols and branched monohydric alcohols.

Examples of the straight-chain monohydric alcohol include 1-20C (carbon number, hereinafter, the same) straight-chain monohydric alcohols such as methanol, ethanol, n-propanol, n-butanol, n-pentanol, n-hexanol, n-heptanol, n-octanol, n-nonanol, n-decanol, n-undecanol, n-dodecanol (lauryl alcohol), n-tridecanol, n-tetradecanol, n-pentadecanol, n-hexadecanol, n-heptadecanol, n-octadecanol (stearyl alcohol), n-nonadecanol, and eicosanol.

Examples of the branched monohydric alcohol include 3-20C branched monohydric alcohols such as isopropanol, isobutanol (isobutyl alcohol), sec-butanol, tert-butanol, isopentanol, isohexanol, isoheptanol, isooctanol, 2-ethylhexane-1-ol, isononanol, isodecanol, 5-ethyl-2-nonanol, trimethylnonyl alcohol, 2-hexyldecanol, 3,9-diethyl-6-tridecanol, 2-isoheptylisoundecanol, 2-octyldodecanol, and another (5-20C) branched alkanol.

Examples of the dihydric alcohol include straight-chain dihydric alcohols such as ethylene glycol, 1,3-propanediol, 1,4-butanediol (1,4-butylene glycol), 1,5-pentanediol, 1,6-hexanediol, 1,4-dihydroxy-2-butene, diethylene glycol, triethylene glycol, dipropylene glycol, and another (7-20C) straight-chain alkane diol; branched dihydric alcohols such as 1,2-propanediol, 1,3-butanediol (1,3-butylene glycol), 1,2-butanediol (1,2-butylene glycol), neopentyl glycol, 3-methyl-1,5-pentanediol, 2,2,2-trimethyl pentanediol, 3,3-dimethylol heptane, 2,6-dimethyl-1-octene-3,8-diol, and another (7-20C) branched alkane diol; and 2-20C dihydric alcohols such as 1,3- or 1,4-cyclohexane dimethanol and a mixture thereof, 1,3- or 1,4-cyclohexanediol or a mixture thereof, hydrogenated bisphenol A, and bisphenol A.

These alcohols can be used alone or in combination of two or more.

As the alcohol, preferably, a monohydric alcohol is used, more preferably, a 1-20C straight-chain monohydric alcohol and a 3-20C branched monohydric alcohol are used. Further more preferably, a 3-20C branched monohydric alcohol is used, particularly preferably, an isobutyl alcohol is used.

When the alcohol is added, the viscosity (described later) of the two-component curable solventless-type laminate adhesive to be obtained at 70° C. in two minutes after (immediately after) the mixture and the viscosity (described later) thereof at 70° C. in 20 minutes after the mixture can be reduced, and a pot life can be prolonged.

The mixing ratio of the alcohol with respect to 100 parts by mass of the pentamethylene diisocyanate is, for example, 0.05 parts by mass or more, preferably 0.10 parts by mass or more, more preferably 0.15 parts by mass or more, and for example, 4.0 parts by mass or less, preferably 2.5 parts by mass or less, more preferably 1.5 parts by mass or less, further more preferably 1.0 part by mass or less, further more preferably 0.70 parts by mass or less, particularly preferably 0.50 parts by mass or less.

When the mixing ratio of the alcohol is within the above-described range, the content ratio of the allophanate-modified isocyanurate derivative and/or the allophanate derivative of the pentamethylene diisocyanate with respect to the isocyanurate derivative of the pentamethylene diisocyanate (that is, the content ratio of the allophanate group in the derivative of the pentamethylene diisocyanate) can be adjusted, and thus, continuous application and laminating properties can be improved, and an excellent adhesive force immediately after the application to the film can be developed.

As the urethane reaction conditions, the reaction temperature is, for example, room temperature (for example, 25° C.) or more, preferably 40° C. or more, and for example, 100° C. or less, preferably 90° C. or less under an inert gas atmosphere such as nitrogen gas and a normal pressure (atmospheric pressure). The reaction time is, for example, 0.5 hours or more, preferably 1 hour or more, and for example, 10 hours or less, preferably 6 hours or less, more preferably 3 hours or less.

In the above-described urethane reaction, a known urethane catalyst (for example, amines, organic metal compound, etc.) may be blended.

In this manner, a pentamethylene diisocyanate in which a part thereof is urethane-modified (that is, a pentamethylene diisocyanate composition containing a urethane-modified pentamethylene diisocyanate and an (unreacted) pentamethylene diisocyanate) can be obtained.

Next, to be subjected to the isocyanurate reaction, the pentamethylene diisocyanate in which a part thereof is urethane-modified is subjected to isocyanurate cyclization reaction under the presence of an isocyanurate catalyst.

Examples of the isocyanurate catalyst include hydroxides and their organic weak acid salts of tetraalkylammonium such as tetramethylammonium, tetraethylammonium, tetrabutylammonium, trimethylbenzylammonium, and tributylbenzylammonium; hydroxides and their organic weak acid salts of trialkylhydroxyalkylammonium such as trimethylhydroxypropylammonium (also known as N-(2-hydroxypropyl)-N,N,N-trimethylammonium), trimethylhydroxyethylammonium, triethylhydroxypropylammonium, and triethylhydroxyethylammonium (for example, N-(2-hydroxypropyl)-N,N,N-trimethylammonium-2-ethylhexanoate etc.); metal salts (for example, alkali metal salt, magnesium salt, tin salt, zinc salt, lead salt, etc.) of alkylcarboxylic acid such as acetic acid, caproic acid, octylic acid, myristic acid, and naphthenic acid; metal chelate compounds of β-diketone such as aluminum acetylacetone and lithium acetylacetone; Friedel-Crafts catalysts such as aluminum chloride and boron trifluoride; various organic metal compounds such as titanium tetrabutylate and tributyl antimony oxide; and aminosilyl group-containing compounds such as hexamethylsilazane.

These isocyanurate catalysts can be used alone or in combination of two or more.

As the isocyanurate catalyst, preferably, an organic weak acid salt of trialkylhydroxyalkylammonium is used, more preferably, N-(2-hydroxypropyl)-N,N,N-trimethylammonium-2-ethylhexanoate is used.

The mixing ratio of the isocyanurate catalyst (100% conversion of active component) with respect to 100 parts by mass of the pentamethylene diisocyanate is, for example, 0.001 parts by mass or more, preferably 0.003 parts by mass or more, and for example, 0.1 parts by mass or less, preferably 0.05 parts by mass or less.

As the reaction conditions of the isocyanurate cyclization reaction, the reaction temperature is, for example, 50° C. or more, preferably 70° C. or more, more preferably 80° C. or more, and for example, 120° C. or less, preferably 100° C. or less under an inert gas atmosphere such as nitrogen gas and a normal pressure (atmospheric pressure). The reaction time is, for example, 5 minutes or more, preferably 10 minutes or more, more preferably 15 minutes or more, and for example, 120 minutes or less, preferably 60 minutes or less.

In the above-described isocyanurate cyclization reaction, when the equivalent of the isocyanate group reaches a predetermined ratio to be described later, for example, a reaction terminator is added to a reaction liquid to deactivate the catalyst to terminate the isocyanurate cyclization reaction. Examples of the reaction terminator include phosphoric acid, monochloroacetic acid, benzoyl chloride, dodecylbenzenesulfonic acid, toluenesulfonic acid (o- or p-toluenesulfonic acid), and a derivative thereof (for example, o- or p-toluenesulfonic acid methyl etc.), and toluenesulfoneamide (o- or p-toluenesulfoneamide). In this case, an adsorbent that adsorbs a catalyst such as chelate resin and ion exchange resin is added, so that the isocyanurate cyclization reaction can be also terminated.

The equivalent of the isocyanate group of the derivative of the pentamethylene diisocyanate is, for example, 160 or more, preferably 165 or more, and for example, 300 or less, preferably 250 or less. The number average molecular weight of the derivative of the pentamethylene diisocyanate is, for example, 300 or more, preferably 450 or more, and for example, 1500 or less, preferably 1000 or less.

When the equivalent of the isocyanate group is within the above-described range, the reaction of the derivative of the pentamethylene diisocyanate can be adjusted to have an appropriate reaction amount such that further reaction of the derivative of the pentamethylene diisocyanate to be obtained can be suppressed, and appropriate solubility and appropriate compatibility are ensured, so that the derivative of the pentamethylene diisocyanate having desired appropriate viscosity can be obtained.

The equivalent of the isocyanate group is the same as the amine equivalent, and can be obtained by an A method or a B method of JIS K 1603-1 (2007) (hereinafter, the same). The equivalent of the isocyanate group can be converted from the formula of the equivalent of the isocyanate group and that of the amine equivalent of JIS K 1603-1 (2007) to the content rate of the isocyanate group. The number average molecular weight can be calculated from a chart of the gel permeation chromatograph (hereinafter, the same).

In this manner, the pentamethylene diisocyanate can be subjected to the isocyanurate reaction.

In the isocyanurate reaction, the pentamethylene diisocyanate in which a part thereof is urethane-modified is subjected to cyclization reaction, so that the above-described allophanate-modified isocyanurate derivative and/or the above-described allophanate derivative are/is also produced along with the above-described isocyanurate derivative.

In this manner, the allophanate group that is contained in the derivative of the pentamethylene diisocyanate is derived from the pentamethylene diisocyanate and the alcohol. That is, the allophanate group that is contained in the derivative of the pentamethylene diisocyanate is a reaction forming group that is formed by the reaction of the pentamethylene diisocyanate and the alcohol. As the alcohol for deriving the allophanate group, preferably, a monohydric alcohol capable of being used in the above-described urethane reaction is used, more preferably, an isobutyl alcohol is used.

By using the monohydric alcohol, workability and an adhesive strength at the time of the application can be further improved.

In the isocyanurate reaction, there may be a case where two pentamethylene diisocyanates react, and a uretdione derivative of the pentamethylene diisocyanate having a uretdione group is produced as a byproduct.

In the above-described isocyanurate reaction of the pentamethylene diisocyanate, an iminooxadiazinedione derivative that is a structural isomer of the isocyanurate derivative may be slightly produced as a byproduct.

In the above-described isocyanurate cyclization reaction, to adjust the isocyanurate reaction, for example, an organic phosphite described in Japanese Unexamined Patent Publication No. S61-129173 can be also blended as an auxiliary catalyst.

Examples of the organic phosphite include organic phosphite diester and organic phosphite triester. To be more specific, examples thereof include monophosphites such as triethylphosphite, tributylphosphite, tridecylphosphite, tris(tridecyl)phosphite, triphenylphosphite, tris(nonylphenyl)phosphite, tris(2,4-di-t-butylphenyl)phosphite, and diphenyl(tridecyl)phosphite and di-, tri-, or tetra-phosphites derived from a polyhydric alcohol such as distearyl.pentaerythrityl.diphosphite, tripentaerythritol.triphosphite and tetraphenyl.dipropyleneglycol.diphosphite.

These organic phosphites can be used alone or in combination of two or more.

As the organic phosphite, preferably, monophosphites are used, more preferably, tridecylphosphite and tris(tridecyl)phosphite are used.

The mixing ratio of the organic phosphite with respect to 100 parts by mass of the pentamethylene diisocyanate is, for example, 0.01 parts by mass or more, preferably 0.05 parts by mass or more, more preferably 0.10 parts by mass or more, and for example, 1.0 part by mass or less, preferably 0.50 parts by mass or less.

In the above-described isocyanurate cyclization reaction, for example, a reaction stabilizer including a hindered phenol antioxidant such as 2,6-di(tert-butyl)-4-methylphenol (BHT), IRGANOX 1010, IRGANOX 1076, IRGANOX 1135, and IRGANOX 245 (hereinabove, manufactured by BASF Japan Ltd., trade name) can be also blended as needed.

The mixing ratio of the reaction stabilizer with respect to 100 parts by mass of the pentamethylene diisocyanate is, for example, 0.01 parts by mass or more, preferably 0.05 parts by mass or more, and for example, 1.0 part by mass or less, preferably 0.10 parts by mass or less.

The above-described auxiliary catalyst and the above-described reaction stabilizer can be also added in the above-described urethane reaction.

In the above-described isocyanurate reaction, a known reaction solvent may be also blended as needed.

After the termination of the reaction, the unreacted pentamethylene diisocyanate (including a catalyst, a reaction solvent, and/or a catalyst inactivator, when the catalyst, the reaction solvent, and/or the catalyst inactivator is blended) is removed from a reaction liquid mixture to be obtained by, for example, a known method such as distillation including thin-film distillation (Smith distillation) and extraction, so that a derivative of the pentamethylene diisocyanate is obtained.

After removing the unreacted pentamethylene diisocyanate, the above-described reaction terminator as a stabilizer can be also added to the derivative of the pentamethylene diisocyanate to be obtained at an arbitrary addition rate.

In this manner, the derivative of the pentamethylene diisocyanate is obtained.

The derivative of the pentamethylene diisocyanate can be also prepared by blending two or more derivatives of the pentamethylene diisocyanate each having different formulations.

The viscosity at 25° C. of the derivative of the pentamethylene diisocyanate thus obtained is, for example, 700 mPa·s or more, preferably 1000 mPa·s or more, more preferably 1500 mPa·s or more, further more preferably 1800 mPa·s or more, and for example, 2200 mPa·s or less, preferably 2000 mPa·s or less, more preferably 1950 mPa·s or less.

When the viscosity at 25° C. of the derivative of the pentamethylene diisocyanate is within the above-described range, the viscosity (described later) at 70° C. in two minutes after (immediately after) the mixture of the two-component curable solventless-type laminate adhesive to be obtained can be reduced.

The viscosity at 25° C. of the derivative of the pentamethylene diisocyanate can be measured in conformity with Examples to be described later.

The polyisocyanate component may contain the derivative of the pentamethylene diisocyanate alone, and furthermore, can contain another polyisocyanate and/or a derivative thereof in addition to the derivative of the pentamethylene diisocyanate.

Examples of the other polyisocyanate and/or the derivative thereof include polyisocyanate monomers (hereinto, excluding the pentamethylene diisocyanate) and polyisocyanate derivatives (hereinto, excluding the derivative of the pentamethylene diisocyanate).

Examples of the polyisocyanate monomer include polyisocyanates such as aromatic polyisocyanate, aralipathic polyisocyanate, alicyclic polyisocyanate, and aliphatic polyisocyanate.

Examples of the aromatic polyisocyanate include aromatic diisocyanates such as m- or p-phenylene diisocyanate or a mixture thereof, 2,4- or 2,6-tolylene diisocyanate or a mixture thereof (TDI), 4,4'-, 2,4'-, or 2,2'-diphenylmethane diisocyanate or a mixture thereof (MDI), 4,4'-toluidine diisocyanate (TODI), 4,4'-diphenylether diisocyanate, 4,4'-diphenyl diisocyanate, and 1,5-naphthalene diisocyanate (NDI).

Examples of the aralipathic polyisocyanate include aralipathic diisocyanates such as 1,3- or 1,4-xylylene diisocyanate or a mixture thereof (XDI), 1,3- or 1,4-tetramethylxylylene diisocyanate or a mixture thereof (TMXDI), and ω,ω'-diisocyanate-1,4-diethylbenzene.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate: IPDI), 4,4'-, 2,4'-, or 2,2'-dicyclohexylmethane diisocyanate or a mixture thereof (hydrogenated MDI), methyl-2,4-cyclohexane diisocyanate, methyl-2,6-cyclohexane diisocyanate, 1,3-, or 1,4-bis(isocyanatomethyl) cyclohexane or a mixture thereof (hydrogenated XDI), and norbornane diisocyanate (NBDI).

Examples of the aliphatic polyisocyanate include aliphatic diisocyanates such as trimethylene diisocyanate, tetramethylene diisocyanate, hexamethylene diisocyanate (HDI), 1,2-, 2,3-, or 1,3-butylene diisocyanate, and 2,4,4- or 2,2,4-trimethylhexamethylene diisocyanate.

These polyisocyanate monomers can be used alone or in combination of two or more.

Examples of the polyisocyanate derivative include multimers of the above-described polyisocyanate monomer (for example, dimer, trimer, pentamer, heptamer, etc.); allophanate derivatives of the above-described polyisocyanate monomer (for example, allophanate derivative etc. produced by the reaction of the above-described polyisocyanate monomer and the alcohol); biuret derivatives of the above-described polyisocyanate monomer (for example, biuret derivative etc. produced by the reaction of the above-described polyisocyanate monomer, water, or amines); urea derivatives of the above-described polyisocyanate monomer (for example, urea derivative etc. produced by the reaction of the above-described polyisocyanate monomer and the diamine); oxadiazinetrione derivatives of the above-described polyisocyanate monomer (for example, oxadiazinetrione derivative etc. produced by the reaction of the above-described polyisocyanate monomer and the carbonic acid gas); carbodiimide derivatives of the above-described polyisocyanate monomer (for example, carbodiimide derivative etc. produced by the decarboxylation condensation reaction of the above-described polyisocyanate monomer); and polyol derivatives of the above-described polyisocyanate monomer (for example, a polyol derivative (alcohol adduct) produced by the reaction of the above-described polyisocyanate monomer and a low molecular weight polyol to be described later (preferably, a low molecular weight triol to be described later), and a polyol derivative (polyisocyanate group-terminated prepolymer) produced by the reaction of the above-described polyisocyanate monomer and a low molecular weight polyol to be described later and/or a high molecular weight polyol to be described later (preferably, a high molecular weight polyol to be described later), etc.).

These polyisocyanate derivatives can be used alone or in combination of two or more.

These other polyisocyanates and/or derivatives thereof can be used alone or in combination of two or more.

As the other polyisocyanate and/or the derivative thereof, preferably, a polyisocyanate derivative is used, more preferably, a polyol derivative of the polyisocyanate monomer is used, further more preferably, a polyisocyanate group-terminated prepolymer is used.

The polyisocyanate group-terminated prepolymer is a urethane prepolymer having two or more isocyanate groups at the end of the molecule, and can be obtained by subjecting the polyisocyanate (polyisocyanate selected from the polyisocyanate monomer (hereinto, including the pentamethylene diisocyanate) and the polyisocyanate derivative (hereinto, including the derivative of the pentamethylene diisocyanate), preferably, the polyisocyanate selected from the polyisocyanate monomer) and the polyol (described later) to the urethane reaction at such a ratio that the equivalent ratio (NCO/OH) of the isocyanate group of the polyisocyanate with respect to the hydroxyl group of the polyol (described later) is above 1, preferably 2 or more and 100 or less.

The urethane reaction can be in conformity with a known method. In the reaction of the polyisocyanate monomer and the polyol (described later), preferably, the unreacted polyisocyanate monomer is removed by a known removing method such as thin film distillation method.

As the polyisocyanate group-terminated prepolymer, preferably, a diisocyanate group-terminated prepolymer is used.

To be specific, the diisocyanate group-terminated prepolymer is a reaction product obtained by the reaction of the diisocyanate illustrated in the above-described polyisocyanate (the aromatic diisocyanate, the araliphatic diisocyanate, the alicyclic diisocyanate, and the aliphatic diisocyanate) and the diol.

In the diisocyanate group-terminated prepolymer, in the diisocyante, preferably, the araliphatic diisocyanate and/or the derivative thereof, and/or, the aliphatic diisocyanate and/or the derivative thereof are contained, more preferably, the araliphatic diisocyanate and/or the derivative thereof alone are/is contained.

In the diisocyanate group-terminated prepolymer, as the araliphatic diisocyanate and/or the derivative thereof, preferably, XDI (xylylene diisocyanate) and/or the derivative thereof are/is used, more preferably, XDI is used.

In the diisocyanate group-terminated prepolymer, as the aliphatic diisocyanate, preferably, HDI (hexamethylene diisocyanate) and/or the derivative thereof are/is used, more preferably, the derivative of HDI is used, further more preferably, the allophanate derivative of HDI is used.

In the diisocyanate group-terminated prepolymer, in the diol, a low molecular weight diol (described later) and/or a high molecular weight diol (described later) are/is contained, preferably, a high molecular weight diol (described later) is contained, more preferably, a polyester diol (described later) is contained.

The diisocyanate group-terminated prepolymer is preferably a reaction product of the diisocyante containing the above-described araliphatic diisocyanate and the diol containing the high molecular weight diol (described later). To be specific, examples of the diisocyanate group-terminated prepolymer include a reaction product of the araliphatic diisocyanate and the polyester diol (described later), a reaction product of the allophanate modified product of the aliphatic diisocyanate and the polyester diol (described later), and a mixture thereof. Preferably, a reaction product of XDI and the polyester diol (described later), a reaction product of the allophanate modified product of HDI and the polyester diol (described later), and a mixture thereof are used, more preferably, a reaction product of XDI and the polyester diol (described later) is used.

The equivalent of the isocyanate group of the diisocyanate group-terminated prepolymer is, for example, 200 or more, preferably 300 or more, and for example, 2000 or less, preferably 1000 or less. The number average molecular weight of the diisocyanate group-terminated prepolymer is, for example, 400 or more, preferably 600 or more, and for example, 4000 or less, preferably 2000 or less.

In the diisocyanate group-terminated prepolymer, the content of the unreacted diisocyanate is, for example, 15 mass % or less, preferably 5 mass % or less, more preferably 1 mass % or less.

The content of the unreacted diisocyanate can be, for example, obtained by HPLC measurement.

The content ratio of the diisocyanate group-terminated prepolymer with respect to the polyisocyanate component is, for example, 3 mass % or more, preferably 5 mass % or more, more preferably 10 mass % or more, and for example, 90 mass % or less, preferably 80 mass % or less, more preferably 70 mass % or less.

The polyisocyanate component can be prepared by blending the derivative of the pentamethylene diisocyanate, preferably blending the derivative of the pentamethylene diisocyanate with the diisocyanate group-terminated prepolymer. To be specific, the polyisocyanate component can be, for example, prepared by stirring and mixing each of the components described above under an inert gas atmosphere at a predetermined temperature.

The equivalent of the isocyanate group of the polyisocyanate component thus prepared is, for example, 150 or more, preferably 200 or more, and for example, 750 or less, preferably 500 or less.

In the present invention, the average functionality of the polyisocyanate component is, for example, 2.00 or more, preferably 2.10 or more, and for example, 2.90 or less, preferably 2.80 or less.

The polyol component does not substantially contain a solvent such as water, that is, substantially has the solid content of 100%. Not substantially containing a solvent allows containing an unavoidable solvent such as solvent of a catalyst and solvent of an additive at a ratio of, for example, 0.5 mass % or less.

Examples of the polyol component (polyol) include low molecular weight polyols and high molecular weight polyols.

The low molecular weight polyol is a bifunctional or more polyol having two or more hydroxyl groups and a molecular weight (number average molecular weight) of, for example, below 400, preferably below 300, and usually 60 or more. Examples thereof include low molecular weight diols, low molecular weight triols, and low molecular weight polyols having four or more hydroxyl groups.

The low molecular weight diol is a bifunctional low molecular weight polyol having two hydroxyl groups, and examples thereof include aliphatic diols, alicyclic diols, and aromatic diols.

Examples of the aliphatic diol include ethylene glycol, diethylene glycol, triethylene glycol, propylene glycol, dipropylene glycol, tripropylene glycol, 1,4-butanediol, 1,3-butanediol, 1,2-butanediol, 2-methyl-1,3-propanediol, 1,5-pentanediol, 3-methyl-1,5-pentanediol, 2,4-diethyl-1,5-pentanediol, 2,2,4-trimethylpentane-1,3-diol, 1,6-hexanediol, neopentyl glycol, 1,5-heptanediol, 1,7-heptanediol, 3,3'-dimethylolheptane, 1,8-octanediol, 1,9-nonanediol, 1,10-decanediol, 1,11-undecanediol, 1,12-undecanediol, and 12-hydroxystearyl alcohol.

Examples of the alicyclic diol include hydrogenated bisphenol A, hydrogenated xylylenediol, cyclohexanediol, cyclohexanedimethanol, and hydrogenated dimer diol.

Examples of the aromatic diol include bisphenol A, bis-hydroxyethyl terephthalate, catechol, resorcin, hydroquinone, and 1,3- or 1,4-xylylenediol.

These low molecular weight diols can be used alone or in combination of two or more.

The low molecular weight triol is a trifunctional low molecular weight polyol having three hydroxyl groups, and examples thereof include glycerin, 2-methyl-2-hydroxymethyl-1,3-propanediol, 2,4-dihydroxy-3-hydroxymethylpentane, 1,2,6-hexanetriol, trimethylolethane, trimethylolpropane, 2-methyl-2-hydroxymethyl-1,3-propanediol, 2,4-dihydroxy-3-(hydroxymethyl)pentane, 2,2-bis(hydroxymethyl)-3-butanol, and another (8-24C) aliphatic triol. Preferably, trimethylolpropane is used.

These low molecular weight triols can be used alone or in combination of two or more.

Examples of the low molecular weight polyol having four or more hydroxyl groups include tetramethylolmethane, pentaerythritol, dipentaerythritol, D-sorbitol, xylitol, D-mannitol and D-mannite.

These low molecular weight polyols having four or more hydroxyl groups can be used alone or in combination of two or more.

These low molecular weight polyols can be used alone or in combination of two or more.

The high molecular weight polyol is a bifunctional or more polyol having two or more hydroxyl groups and a number average molecular weight of, for example, 300 or more, preferably 400 or more, and 2000 or less. Examples thereof include polyether polyol, polyester polyol, polycarbonate polyol, acrylic polyol, epoxy polyol, natural oil polyol, silicone polyol, fluorine polyol, polyolefin polyol, and polyurethane polyol. Preferably, a polyester polyol and a polyurethane polyol are used.

As the high molecular weight polyol, preferably, a high molecular weight diol having a number average molecular weight of, for example, 300 or more, preferably, 400 or more and 2000 or less is used. As the high molecular weight diol, of the above-described high molecular weight polyols, a bifunctional polyol (diol) is used.

The number average molecular weight is calibrated with standard polystyrene measured with gel permeation chromatograph (GPC).

Examples of the polyester polyol include polyester polyols obtained by the condensation reaction or the transesterification reaction of the polyhydric alcohol selected from one or two or more low molecular weight polyols described above and a polybasic acid, an alkylester thereof, an acid anhydride thereof, and an acid halide thereof.

Examples of the polybasic acid include dibasic acids such as aliphatic polybasic acids including oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, hydrogenated dimer acid, maleic acid, fumaric acid, itaconic acid, and HET acid and aromatic polybasic acids including orthophthalic acid, isophthalic acid, terephthalic acid, toluene dicarboxylic acid, naphthalene dicarboxylic acid, and dimer acid.

Examples of the alkyl ester of the polybasic acid include methyl ester and ethyl ester of the above-described polybasic acid.

Examples of the acid anhydride include acid anhydrides derived from the above-described polybasic acid, and examples thereof include oxalic anhydride, succinic anhydride, maleic anhydride, phthalic anhydride, 2-alkyl (12-18C) succinic anhydride, tetrahydrophthalic anhydride, and trimellitic anhydride.

Examples of the acid halide include acid halides derived from the above-described polybasic acid, and examples thereof include oxalyl dichloride, dichloride adipate, and sebacic acid dichloride.

The condensation reaction and the transesterification reaction described above can be performed under a known esterification catalyst under known reaction conditions as needed.

As the polyester polyol, for example, a vegetable oil-based polyester polyol obtained by subjecting a hydroxycarboxylic acid such as a hydroxyl group-containing vegetable oil fatty acid (for example, castor oil fatty acid containing a ricinoleic acid, hydrogenated castor oil fatty acid containing a 12-hydroxystearic acid, lactic acid, etc.) to the condensation reaction under known conditions with the above-described low molecular weight polyol as an initiator is used.

Furthermore, examples of the polyester polyol include polyester polyols such as polycaprolactone polyol and polyvalerolactone polyol obtained by subjecting lactones such as ε-caprolactone and γ-valerolactone and lactides such as L-lactide and D-lactide to ring-opening polymerization with the above-described low molecular weight polyol as an initiator.

These polyester polyols can be used alone or in combination of two or more.

As the polyester polyol, preferably, a polyester diol obtained by the condensation reaction or the transesterification reaction of the dihydric alcohol (preferably, aliphatic diol) selected from the above-described low molecular weight diols and a dibasic acid (preferably, combination of an aliphatic polybasic acid and an aromatic polybasic acid), an alkylester thereof, an acid anhydride thereof, and an acid halide thereof is used.

In the polyester polyol, the above-described acid anhydride is subjected to ring-opening reaction with a part of the hydroxyl group at the end thereof, and a part of the hydroxyl group can be prepared as a carboxylic acid group for the purpose of further improvement of the adhesive strength.

The polyurethane polyol can be obtained by subjecting the low molecular weight polyol and/or the high molecular weight polyol described above, and the above-described polyisocyanate (hereinto, including the pentamethylene diisocyanate and the derivative thereof) to the urethane reaction at such a ratio that the equivalent ratio (NCO/OH) of the isocyanate group of the diisocyanate with respect to the hydroxyl group of the low molecular weight polyol is below 1.

In the polyurethane polyol, as the low molecular weight polyol and/or the high molecular weight polyol, preferably, the low molecular weight triol and the polyester polyol are used in combination.

In the polyurethane polyol, as the polyisocyante, preferably, the above-described diisocyanate is used, more preferably, an araliphatic diisocyanate is used, more preferably, XDI (xylylene diisocyanate) is used.

That is, as the polyurethane polyol, preferably, a polyurethane triol obtained by subjecting the above-described low molecular weight triol and polyester polyol, and the above-described araliphatic diisocyanate to the urethane reaction is used, to be specific, a polyurethane triol obtained by subjecting the trimethylolpropane and the polyester polyol, and the XDI to the urethane reaction is used.

These polyurethane polyols can be used alone or in combination of two or more.

These high molecular weight polyols can be used alone or in combination of two or more.

As the high molecular weight polyol, more preferably, a polyurethane polyol is used.

The equivalent of the hydroxyl group of the high molecular weight polyol is, for example, 150 or more, preferably 200 or more, and for example, 10000 or less, preferably 8000 or less, and the number average molecular weight thereof is, for example, 300 or more, preferably 400 or more, and for example, 30000 or less, preferably 25000 or less, more preferably 2000 or less.

The equivalent of the hydroxyl group can be calculated by obtaining a hydroxyl value from an acetylation method, a phthalated method, etc. in conformity with the A method or the B method of JIS K 1557-1 (hereinafter, the same). The number average molecular weight can be obtained from the equivalent of the hydroxyl group and the average functionality, and the average functionality can be obtained from the material formulation of the high molecular weight polyol (hereinafter, the same).

These polyol components can be used alone or in combination of two or more.

In the two-component curable solventless-type adhesive of the present invention, for example, a phosphorus oxyacid, a derivative thereof, and a silane coupling agent can be blended in any one of or both of the polyisocyanate component and the polyol component as needed.

In the phosphorus oxyacid and the derivative thereof, examples of the phosphorus oxyacid include phosphoric acids such as hypophosphoric acid, phosphorous acid, orthophosphoric acid, and hypophosphoric acid and condensed phosphoric acids such as metaphosphoric acid, pyrophosphoric acid, tripolyphosphoric acid, polyphosphoric acid, and ultraphosphoric acid.

Examples of the derivative of the phosphorus oxyacid include phosphates or condensed phosphates such as sodium and potassium; monoesters such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite, and monophenyl phosphite; di- or tri-esters such as di-2-ethylhexyl orthophosphate, diphenyl orthophosphate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethyl hexyl phosphite, and triphenyl phosphite; and mono-, di-, or tri-esters obtained from the condensed phosphoric acid and the alcohols.

As the phosphorus oxyacid or the derivative thereof, preferably, phosphoric acids are used, further more preferably, an orthophosphoric acid (phosphoric acid) is used.

As the phosphorus oxyacid or the derivative thereof, each of the phosphorus oxyacids or the derivatives thereof described above can be used alone or in combination of two or more. The content ratio of the phosphorus oxyacid or the derivative thereof with respect to 100 parts by mass of the total amount of the polyisocyanate component and the polyol component is, for example, 0.001 parts by mass or more, preferably 0.01 parts by mass or more, and for example, 3.0 parts by mass or less, preferably 2.5 parts by mass or less.

The silane coupling agent is, for example, represented by the structural formula: R—Si≡$(X)_3$ or R—Si≡(R') $(X)_2$ (wherein, R represents an organic group having a vinyl group, an epoxy group, an amino group, an imino group, an isocyanate group, or a mercapto group; R' represents a 1-4C lower alkyl group; and X represents a methoxy group, an ethoxy group, or a chloro atom).

To be specific, examples of the silane coupling agent include chlorosilanes such as vinyltrichlorosilane; epoxysilanes such as γ-glycidoxypropyltrimethoxysilane, γ-glycidoxypropyltriethoxysilane, β-(3,4-epoxycyclohexyl)ethyltrimethoxysilane, and di(γ-glycidoxypropyl) dimethoxysilane; aminosilanes such as N-β-(aminoethyl)-γ-aminopropyltrimethoxysilane, γ-aminopropyltriethoxysilane (also known as 3-aminopropyltriethoxysilane), N-β-(aminoethyl)-γ-propylmethyldimethoxysilane, n-(dimethoxymethylsilylpropyl)ethylenediamine, n-(triethoxysilylpropyl)ethylenediamine, and N-phenyl-γ-aminopropyltrimethoxysilane; vinylsilanes such as vinyltriethoxysilane; and isocyanatosilanes such as γ-isocyanatopropyltrimethoxysilane and γ-isocyanatopropyltriethoxy silane.

As the silane coupling agent, preferably, an epoxysilane and an aminosilane are used, more preferably, an epoxysilane and an aminosilane are used in combination.

As the silane coupling agent, each of the silane coupling agents described above can be used alone or in combination of two or more. The content ratio of the silane coupling agent with respect to 100 parts by mass of the total amount of the polyisocyanate component and the polyol component is, for example, 0.001 parts by mass or more, preferably 0.01 parts by mass or more, and for example, 10 parts by mass or less, preferably 5 parts by mass or less.

Furthermore, for example, additives can be appropriately blended in any one of or both of the polyisocyanate component and the polyol component as needed. Examples of the additives include epoxy resins, catalysts, coating property improvers, leveling agents, defoaming agents, stabilizers including antioxidants and ultraviolet absorbers, plasticizers, surfactants, pigments, fillers, organic or inorganic fine particles, and antifungal agents. The mixing amount of the additive is appropriately determined in accordance with its purpose and use.

In the two-component curable solventless-type laminate adhesive of the present invention, the polyisocyanate component and the polyol component are separately prepared and stored, and at the time of its use, the polyisocyanate component and the polyol component are mixed to be prepared at, for example, 30° C. or more, preferably 40° C. or more, and for example, 100° C. or less, preferably 90° C. or less to be then applied to (coated on) a film.

As the mixing ratio of the polyisocyanate component and the polyol component, for example, as the mass ratio of the polyisocyanate component with respect to the polyol component, the ratio of the polyisocyanate component with respect to 100 parts by mass of the polyol component is, for example, 30 parts by mass or more, preferably 40 parts by mass or more, and for example, 500 parts by mass or less, preferably 300 parts by mass or less, and the equivalent ratio (NCO/OH) of the isocyanate group of the polyisocyanate component with respect to the hydroxyl group of the polyol component is, for example, 0.3 or more, preferably 0.5 or more, and for example, 5.0 or less, preferably 3.0 or less.

By formulating the two-component curable solventless-type laminate adhesive of the present invention as described above, for example, the polyisocyanate component and the polyol component are uniformly mixed at 70° C., and a liquid mixture to be obtained is stored at 70° C. The viscosity thereof at 70° C. in two minutes after (immediately after) the mixture is, for example, 400 mPa·s or more, preferably 600 mPa·s or more, more preferably 650 mPa·s or more, further more preferably 800 mPa·s or more, particularly preferably 850 mPa·s or more, and for example, 1600 mPa·s or less, preferably 1500 mPa·s or less, more preferably 1000 mPa·s or less, further more preferably 960 mPa·s or less, particularly preferably 920 mPa·s or less.

When the viscosity at 70° C. in two minutes after the mixture is within such a viscosity range, after mixing the polyisocyanate component and the polyol component, the two-component curable solventless-type laminate adhesive can be applied to a film (for example, barrier film, plastic film, etc.) with a solventless-type laminator with excellent work efficiency.

The viscosity at 70° C. in two minutes after (immediately after) the mixture is the viscosity in which the polyisocyanate component and the polyol component are uniformly mixed at 70° C., and a liquid mixture to be obtained (two-component curable solventless-type laminate adhesive) is stored at 70° C. for two minutes to be measured at 70° C. in conformity with Examples to be described later.

By formulating the two-component curable solventless-type laminate adhesive of the present invention as described above, for example, the polyisocyanate component and the polyol component are uniformly mixed at 70° C., and a liquid mixture to be obtained is stored at 70° C. The viscosity thereof at 70° C. in 20 minutes after the mixture is, for example, 1850 mPa·s or more, preferably 2000 mPa·s or more, more preferably 2200 mPa·s or more, further more preferably 2400 mPa·s or more, further more preferably 2600 mPa·s or more, particularly preferably 2610 mPa·s or more, and for example, 4000 mPa·s or less, preferably 3900 mPa·s or less, more preferably 3500 mPa·s or less, further more preferably 3000 mPa·s or less, particularly preferably 2700 mPa·s or less.

When the viscosity at 70° C. in 20 minutes after the mixture is within such a viscosity range, the viscosity increase rate after mixing the polyisocyanate component and the polyol component is low, so that the pot life of the liquid mixture to be obtained is long, and workability at the time of the application is improved, and an excellent adhesive force immediately after the application to the film can be developed.

The viscosity at 70° C. in 20 minutes after the mixture is the viscosity in which the polyisocyanate component and the polyol component are uniformly mixed at 70° C., and a liquid mixture to be obtained is stored at 70° C. for 20 minutes to be measured at 70° C. in conformity with Examples to be described later.

The two-component curable solventless-type laminate adhesive of the present invention is, for example, used as a laminate adhesive for producing a composite film by laminating a film such as barrier film and plastic film as an adherend.

To be specific, the two-component curable solventless-type laminate adhesive of the present invention is, for example, used in bonding of the plastic films to each other and bonding of the barrier film to the plastic film.

The plastic film is, for example, prepared from an olefin polymer (for example, polyethylene, polypropylene, etc.), a polyester polymer (for example, polyalkylene terephthalate such as polyethylene terephthalate and polybutylene terephthalate, polyalkylene naphthalate, copolyester mainly composed of the polyalkylene arylate unit thereof, etc.), a polyamide polymer (for example, nylon such as nylon 6 and nylon 66 etc.), and a vinyl polymer (for example, vinyl polychloride, ethylene-vinyl acetate copolymer, ethylene-vinyl alcohol copolymer, etc.). The thickness of the plastic film is usually 5 μm or more, and usually 200 μm or less.

As the plastic film, any one of an unstretched film (unstretched polyethylene, polypropylene, etc.) and an uniaxially or biaxially stretched film (biaxially stretched polypropylene, polyalkylene terephthalate, nylon, etc.) can be used.

The plastic film can be also prepared as each of the coextruded films or a composite film in which the plastic films are bonded to each other in advance.

The barrier film is a layer having barrier properties with respect to gas or liquid, and an example thereof includes a film containing metal or metal oxide. To be specific, an example thereof includes a metal foil and a plastic film including a barrier layer.

The metal foil is, for example, made of aluminum, stainless steel, iron, copper, and lead. The thickness thereof is, for example, 5 μm or more, and for example, 100 μm or less, preferably 20 μm or less, more preferably 15 μm or less.

An example of the plastic film including a barrier layer includes a film in which an inorganic layer is formed on at least one surface of the above-described plastic film.

The inorganic layer can be formed by deposition, sputtering, a sol-gel method, etc. The inorganic layer can be, for example, formed from a simple substance such as titanium, aluminum, and silicon or an inorganic compound (oxide etc.) containing their element. As the inorganic layer, preferably, a deposition film in which aluminum alone, alumina alone, silica alone, or both of the alumina and the silica are deposited to a plastic film is used.

In the plastic film including a barrier layer, an overcoat layer can be also laminated on an exposed side of the barrier layer.

Furthermore, a surface of the plastic film and the barrier film may be subjected to a surface treatment such as corona discharge treatment or a primer treatment with an anchor coat agent. Also, print can be appropriately applied to the plastic film and the barrier film.

In the production of the composite film, for example, with a solventless-type laminator, when the plastic films are bonded to each other, the two-component curable solventless-type laminate adhesive of the present invention in which the polyisocyanate component and the polyol component are blended is applied to the surface of any one of the two plastic films, and the applied surface is bonded to the surface of the other plastic film; and for example, when the barrier film is bonded to the plastic film, the two-component curable solventless-type laminate adhesive of the present invention is applied to the surface of any one of the barrier film and the plastic film, and the applied surface is bonded to the surface of the other barrier film or plastic film. In each case, thereafter, the bonded laminate is aged to be cured under a normal temperature or heating.

As the composite film, for example, when the plastic films are bonded to each other, the two plastic films are bonded to each other (subjected to primary lamination) and, for example, when the barrier film and the plastic film are bonded to each other, the barrier film and the plastic film are bonded to each other (subjected to primary lamination), so that a primary laminate composite film may be produced. Furthermore, another plastic film is bonded to (subjected to secondary lamination) at least one surface of the primary laminate composite film, so that a secondary laminate composite film can be also produced.

In the primary lamination, any one of the barrier film and the plastic film is usually delivered from a delivery roll, the other film is bonded thereto to be wound around a winding roll, and the wound film is heated and aged (for example, aged at 25° C. or more and 60° C. or less) as needed.

In the secondary lamination, the primary laminate composite film is usually delivered from a delivery roll, another plastic film is bonded thereto to be wound around a winding roll, and the wound film is heated and aged (for example, aged at 25° C. or more and 60° C. or less) as needed.

In the production of the secondary laminate composite film, in both of the primary laminate and the secondary laminate, the two-component curable solventless-type laminate adhesive of the present invention may be used, or in any one of the primary laminate and the secondary laminate, the two-component curable solventless-type laminate adhesive of the present invention is used and in the other laminate, another adhesive can be also used.

When the two-component curable solventless-type laminate adhesive of the present invention is used, in the case where the primary lamination and the secondary lamination are continuously performed, a laminate composite film can be efficiently produced without causing a disadvantage such as occurrence of delamination (interlayer exfoliation) from the end portion of a laminate product (composite film) in a tunnel shape or deviation of the adhesive surface of the wound composite film.

The primary and the secondary laminate temperature (application temperature) is usually 35° C. or more, preferably 40° C. or more. There is no limit in the upper limit of the temperature as long as the lamination can be performed, and the temperature is usually 100° C. or less, preferably 90° C. or less, further more preferably 85° C. or less. At the time of the lamination (application), the two-component curable solventless-type laminate adhesive is heated at the temperature within a range of the upper limit or the lower limit of, for example, 35° C. or more, preferably 40° C. or more, and for example, 100° C. or less, preferably 90° C. or less, more preferably 80° C. or less, and the viscosity thereof is appropriately adjusted. The appropriate viscosity is, for example, 100 mPa·s or more, preferably 300 mPa·s or more, and for example, 5000 mPa·s or less, preferably 3000 mPa·s or less at the temperature of the above-described range.

When the heating is performed at 100° C. or less, the reaction of the polyisocyanate component and the polyol component can be suppressed before the application, so that excessively increased viscosity can be prevented, and excellent workability can be ensured.

The application amount of the two-component curable solventless-type laminate adhesive of the present invention is, for example, 0.5 g/m$^2$ or more, preferably 1 g/m$^2$ or more, more preferably 1.5 g/m$^2$ or more, and for example, 5 g/m$^2$ or less, preferably 4.5 g/m$^2$ or less in each of the lamination steps. When the application amount is the above-described lower limit or more, it can be prevented that the two-component curable solventless-type laminate adhesive properties are not sufficiently developed to cause a poor appearance. Meanwhile, when the application amount is the above-described upper limit or less, it can be prevented that an adhesive leaks out of the end portion of the composite film to cause poor quality of the composite film.

As a solventless-type laminate device using the two-component curable solventless-type laminate adhesive of the present invention, any one of a forward transfer application device and a reverse transfer application device (reverse coater) can be used.

In the forward transfer application device, the two-component curable solventless-type laminate adhesive in which the polyisocyanate component and the polyol component are blended is applied to one film passing between one pair of rolls that rotate in the same direction in the facing position. Thereafter, one film is bonded to the other film in a nip roller, thus producing a composite film.

In the reverse transfer application device, the two-component curable solventless-type laminate adhesive in which the polyisocyanate component and the polyol component are blended is applied to one film passing between one pair of rolls that rotate in the direction opposite to each other in the facing position. Thereafter, one film is bonded to the other film in a nip roller, thus producing a composite film.

In this manner, a composite film can be produced by using the two-component curable solventless-type laminate adhesive of the present invention.

The adhesive strength (test method is in conformity with Examples to be described later) after 24 hours of the composite film produced by using the two-component curable solventless-type laminate adhesive of the present invention is, for example, 15.0 N/100 mm or more, preferably, 20.0 N/100 mm or more, more preferably 20.6 N/100 mm or more, further more preferably 24.0 N/100 mm or more, further more preferably 25.0 N/100 mm or more, further more preferably 27.0 N/100 mm or more, further more preferably 28.0 N/100 mm or more, further more preferably 28.5 N/100 mm or more, further more preferably 29.0 N/100 mm or more, further more preferably 29.5 N/100 mm or more, particularly preferably 30.0 N/100 mm or more, and usually 50.0 N/100 mm or less.

The two-component curable solventless-type laminate adhesive of the present invention contains the polyisocyanate component and the polyol component, the polyisocyanate component contains the derivative of the pentamethylene diisocyanate, the derivative of the pentamethylene diisocyanate contains the isocyanurate group and the allophanate group, and the content ratio of the isocyanurate group with respect to 100 moles of the total amount of the isocyanurate group and the allophanate group is 60 moles or more and 99 moles or less.

Thus, the two-component curable solventless-type laminate adhesive of the present invention can reduce the viscosity immediately after the mixture of the polyisocyanate component with the polyol component, and is capable of retaining the pot life long until the application to the film and capable of developing an excellent adhesive strength immediately after the application to the film, so that continuous application and laminating properties can be improved.

Furthermore, the composite film bonded by the two-component curable solventless-type laminate adhesive of the present invention can retain an excellent appearance and an excellent adhesive strength even under severe storage conditions (for example, storage at 60° C. for four weeks).

Accordingly, the two-component curable solventless-type laminate adhesive of the present invention can be, for example, used in refill standing pouches and various packages in the toiletry field, packages of retort food and dried food, packages of pharmaceutical products, electronic and electric components, cell members such as solar cell and fuel cell, living materials such as shopping bags, book covers, and stickers, and construction and industry materials such as decorative sheets.

The present invention includes a cured product prepared by curing the above-described two-component curable solventless-type laminate adhesive (hereinafter, referred to as a resin cured product). An example of the resin cured product includes an adhesive layer that is interposed between each of the films in the composite film. In other words, the above-described composite film includes the resin cured product of the present invention.

The resin cured product of the present invention is obtained from the above-described two-component curable solventless-type laminate adhesive, so that it has an excellent adhesive strength.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

A measurement method used in each of Preparation Examples, Synthetic Examples, Production Examples, Examples, and Comparative Examples is illustrated below.

1. Measurement Method

<Number Average Molecular Weight>

After 40 mg of a sample was dissolved in 4 mL of tetrahydrofuran to prepare as a 1 w/v % solution, the solution was measured with gel permeation chromatograph (GPC) under the following conditions to measure the number average molecular weight (Mn) with standard polystyrene calibration.

Data processing device: part number EMPOWER2 (manufactured by Waters Corporation)
Differential refractive index detector: 2414-type differential refractive index detector
Column: 3 pieces of PLgel 5 μm Mixed-C part number 1110-6500 (manufactured by Polymer Laboratories Ltd.)
Mobile phase: tetrahydrofuran
Column flow: 1 mL/min
Sample concentration: 10 g/L
Injection amount: 100 μL
Measurement temperature 40° C.
Calibration in molecular weight: TSK standard Polystyrene manufactured by TOSOH CORPORATION <Measurement of Equivalent of Isocyanate Group>

The equivalent of the isocyanate group was measured by an A method or a B method of JIS K 1603-1 (2007).

<Calculation of Content Ratio of Isocyanurate Group, Allophanate Group, and Uretdione Group by $^{13}$C-NMR>

By the following device and conditions, $^{13}$C-NMR of a derivative of a pentamethylene diisocyanate was measured; the molar ratio of the allophanate group to the isocyanurate group and the molar ratio of the uretdione group to the total amount of the isocyanurate group and the allophanate group were calculated by the following formula; and from the obtained molar ratios, the content ratio of the isocyanurate group, that of the allophanate group, and that of the uretdione group with respect to 100 moles of the total amount of the isocyanurate group and the allophanate group were calculated. As the criteria of the chemical shift ppm, tetramethylsilane (0 ppm) in the CDCl$_3$ solvent was used.

Device: ECA-500 (manufactured by JEOL Ltd.)
Conditions: measurement frequency: 125 MHz, solvent: CDCl$_3$, solute consistency: 50 mass %, measurement temperature: room temperature (25° C.), number of times of scan: 8500 times, repeating time: 3.0 seconds, pulse width: 30° (3.70 μseconds)

Assigned peak of carbon in the allophanate group (CO group in the allophanate group) (1C (in the case where the alcohol is the monohydric alcohol), 2C (in the case where the alcohol is the dihydric alcohol)): 153.9 ppm Assigned peak of carbon in the uretdione group (CO group in the uretdione group) (2C): 157.2 ppm Assigned peak of carbon in the isocyanurate group (CO group in the isocyanurate group) (3C): 148.5 ppm Molar ratio of the allophanate group to the isocyanurate group=(integrated value of assigned peak of carbon of the allophanate group/X)/(integrated value of assigned peak of carbon of the isocyanurate group/3)

(wherein, in the case of forming the allophanate group, when the reacted alcohol is the monohydric alcohol, X is 1 and when the reacted alcohol is the dihydric alcohol, X is 2)

Molar ratio of the uretdione group to the total amount of the isocyanurate group and the allophanate group=(integrated value of assigned peak of carbon of the uretdione group/2)/((integrated value of assigned peak of carbon of the isocyanurate group/3)+(integrated value of assigned peak of carbon of the allophanate group/X)

(wherein, in the case of forming the allophanate group, when the reacted alcohol is the monohydric alcohol, X is 1 and when the reacted alcohol is the dihydric alcohol, X is 2)

<Measurement of Viscosity (Unit: mPa·s)>

By using an E-type viscometer TV-30 manufactured by Toki Sangyo Co., Ltd. (rotor angle: 1° 34', rotor radius: 24 cm), the viscosity at 25° C. and 70° C. of a measurement sample was measured in conformity with a cone plate viscometer method of JIS K5600-2-3 (2014). The number of revolutions of the cone plate at the time of the measurement was sequentially changed between 100 rpm and 2.5 rpm in accordance with the increase of the viscosity.

2. Material

<Preparation of Derivative of Pentamethylene Diisocyanate>

Preparation Example 1

A four-neck flask equipped with a stirrer, a thermometer, a reflux tube, and a nitrogen introducing tube was charged with 1000 parts by mass of pentamethylene diisocyanate produced in the same manner as that in Example 1 in the description of International Patent Publication No. 2012/121291, 0.5 parts by mass of isobutyl alcohol, 0.6 parts by mass of 2,6-di(tert-butyl)-4-methylphenol, and 1.04 parts by mass of tridecylphosphite (trade name: JP-310, organic phosphite, manufactured by JOHOKU CHEMICAL CO., LTD.) to be then reacted (subjected to urethane reaction) at 80° C. for two hours, thereby producing a reaction liquid.

Next, after the reaction liquid was cooled at 45° C., 0.1 parts by mass of N-(2-hydroxypropyl)-N,N,N-trimethylammonium-2-ethylhexanoate (trade name: DABCO (registered trademark) TMR, manufactured by Air Products Japan K.K.) as an isocyanurate catalyst was added thereto to be further reacted (subjected to isocyanurate cyclization reaction) at 95° C. for 15 minutes.

Thereafter, 0.24 parts by mass of o-toluenesulfonamide was added thereto. The obtained reaction liquid mixture was allowed to pass a thin film distillation device (temperature:

150° C., vacuum degree: 0.09 kPa), so that the unreacted pentamethylene diisocyanate monomer was removed, thereby producing a derivative P1 of the pentamethylene diisocyanate.

Preparation Examples 2 to 10

Each of the derivatives P2 to P10 of the pentamethylene diisocyanate was obtained in the same manner as that of Preparation Example 1, except that the mixing formulation was changed to that shown in Table 1.

Preparation Example 11

A four-neck flask equipped with a stirrer, a thermometer, a reflux tube, and a nitrogen introducing tube was charged with 500 parts by mass of pentamethylene diisocyanate produced in the same manner as that in Example 1 in the description of International Patent Publication No. 2012/121291, 19 parts by mass of isobutyl alcohol, 0.3 parts by mass of 2,6-di(tert-butyl)-4-methylphenol, and 0.3 parts by mass of tris(tridecyl)phosphite (trade name: JP-333E, organic phosphite, manufactured by JOHOKU CHEMICAL CO., LTD.), and the temperature of the mixture was increased to 85° C. to be then subjected to urethane reaction for three hours, thereby producing a reaction liquid.

Next, 0.02 parts by mass of lead octylate (trade name: HEXOATE LEAD 38%, manufactured by TOEI CHEMICAL INDUSTRY CO., LTD.) as an allophanate catalyst was added to the reaction liquid to be then reacted (subjected to allophanate reaction) until the equivalent of the isocyanate group reached the calculated value (101), and thereafter, 0.02 parts by mass of o-toluenesulfonamide was added thereto. The obtained reaction liquid mixture was allowed to pass a thin film distillation device (vacuum degree: 0.093 kPa, temperature: 150° C.), so that the unreacted pentamethylene diisocyanate monomer was removed and furthermore, 0.02 parts by mass of o-toluenesulfonamide was added to 100 parts by mass of the obtained product, thereby producing a derivative P11 of the pentamethylene diisocyanate.

Preparation Example 12

A four-neck flask equipped with a stirrer, a thermometer, a reflux tube, and a nitrogen introducing tube was charged with 500 parts by mass of pentamethylene diisocyanate produced in the same manner as that in Example 1 in the description of International Patent Publication No. 2012/121291, 0.3 parts by mass of 2,6-di(tert-butyl)-4-methylphenol, and 0.3 parts by mass of tris(tridecyl)phosphite (trade name: JP-333E, manufactured by JOHOKU CHEMICAL CO., LTD.), and nitrogen was introduced to the liquid phase (reaction liquid) of the pentamethylene diisocyanate for one hour. Thereafter, the temperature of the reaction liquid was increased to 150° C.

Next, after the reaction (uretdione reaction) continued at the same temperature for 10 hours, the reaction was terminated. The obtained reaction liquid mixture was allowed to pass a thin film distillation device (temperature: 120° C., vacuum degree: 0.093 kPa), so that the unreacted pentamethylene diisocyanate monomer was removed, thereby producing a derivative P12 of the pentamethylene diisocyanate.

Preparation Examples 13 to 19

Each of the derivatives H1 to H7 of the hexamethylene diisocyanate was obtained in the same manner as that of Preparation Example 1, except that the mixing formulation was changed to that shown in Table 1.

Preparation Example 20

A derivative H8 of the hexamethylene diisocyanate was obtained in the same manner as that of Preparation Example 11, except that the mixing formulation was changed to that shown in Table 1.

The mixing formulation, the molar ratio of the isocyanurate group to the allophanate group, the content ratio of the uretdione group, and the viscosity of the derivative of the pentamethylene diisocyanate and the derivative of the hexamethylene diisocyanate obtained in Preparation Examples 1 to 20 are shown in Table 1.

TABLE 1

| | | | | Preparation Ex. 1 | Preparation Ex. 2 | Preparation Ex. 3 | Preparation Ex. 4 | Preparation Ex. 5 |
|---|---|---|---|---|---|---|---|---|
| | | Derivative | | P1 | P2 | P3 | P4 | P5 |
| Formulation | Isocyanate | PDI | parts by mass | 1000 | 1000 | 1000 | 1000 | 1000 |
| | | HDI | parts by mass | | | | | |
| | Alcohol | iBA | parts by mass | 0.5 | 1.0 | 1.6 | 5.3 | 8.0 |
| | | 1,3-BG | parts by mass | | | | | |
| Molar Ratio of Isocyanurate Group/Allophanate Group | | | mol % | 99/1 | 98/2 | 95/5 | 90/10 | 86/14 |
| Content Ratio of Uretdione Group | | | mol % | 1.8 | 1.7 | 1.0 | 0.9 | 0.8 |
| Viscosity of Derivative at 25° C. | | | mPa·s | 2120 | 2000 | 1900 | 1650 | 1350 |

| | | | | Preparation Ex. 6 | Preparation Ex. 7 | Preparation Ex. 8 | Preparation Ex. 9 | Preparation Ex. 10 |
|---|---|---|---|---|---|---|---|---|
| | | Derivative | | P6 | P7 | P8 | P9 | P10 |
| Formulation | Isocyanate | PDI | parts by mass | 1000 | 1000 | 1000 | 1000 | 1000 |
| | | HDI | parts by mass | | | | | |
| | Alcohol | iBA | parts by mass | 12.8 | 22.4 | | 0 | 32.0 |
| | | 1,3-BG | parts by mass | | | 21.8 | | |
| Molar Ratio of Isocyanurate Group/Allophanate Group | | | mol % | 80/20 | 67/33 | 80/20 | 100/0 | 56/44 |

TABLE 1-continued

|  |  |  |  |  |  |  |
|---|---|---|---|---|---|---|
| Content Ratio of Uretdione Group | mol % | 0.6 | 0.7 | 0.9 | 3.0 | 7.0 |
| Viscosity of Derivative at 25° C. | mPa · s | 900 | 750 | 1400 | 1850 | 1790 |

| | | | Preparation Example No. | | | | |
|---|---|---|---|---|---|---|---|
| | | | Preparation Ex. 11 | Preparation Ex. 12 | Preparation Ex. 13 | Preparation Ex. 14 | Preparation Ex. 15 |
| | Derivative | | P11 | P12 | H1 | H2 | H3 |
| Formulation Isocyanate | PDI | parts by mass | 500 | 500 | | | |
| | HDI | parts by mass | | | 1000 | 1000 | 1000 |
| Alcohol | iBA | parts by mass | 19.0 | | 0.4 | 0.9 | 1.8 |
| | 1,3-BG | parts by mass | | | | | |
| Molar Ratio of Isocyanurate Group/Allophanate Group | | mol % | 0/100 | 0/0 | 99/1 | 98/2 | 95/5 |
| Content Ratio of Uretdione Group | | mol % | 1.3 | 100 | 2.0 | 1.9 | 1.8 |
| Viscosity of Derivative at 25° C. | | mPa · s | 100 | 25 | 2800 | 2620 | 2430 |

| | | | Preparation Example No. | | | | |
|---|---|---|---|---|---|---|---|
| | | | Preparation Ex. 16 | Preparation Ex. 17 | Preparation Ex. 18 | Preparation Ex. 19 | Preparation Ex. 20 |
| | Derivative | | H4 | H5 | H6 | H7 | H8 |
| Formulation Isocyanate | PDI | parts by mass | | | | | 500 |
| | HDI | parts by mass | 1000 | 1000 | 1000 | 1000 | |
| Alcohol | iBA | parts by mass | 4.9 | 8.0 | 11.7 | 19.6 | 19.0 |
| | 1,3-BG | parts by mass | | | | | |
| Molar Ratio of Isocyanurate Group/Allophanate Group | | mol % | 90/10 | 85/15 | 80/20 | 70/30 | 0/100 |
| Content Ratio of Uretdione Group | | mol % | 1.1 | 1.0 | 0.9 | 0.9 | 1.4 |
| Viscosity of Derivative at 25° C. | | mPa · s | 2100 | 1430 | 1200 | 760 | 110 |

<Description of Abbreviations and Designations in Table 1>

PDI: 1,5-pentamethylene diisocyanate
HDI: 1,6-hexamethylene diisocyanate
iBA: isobutyl alcohol
1,3-BG: 1,3-butanediol Synthesis of Diisocyanate Group-Terminated Prepolymer Synthetic Example 1: Synthesis of Polyester Polyol A A reaction vessel was charged with 283 parts by mass of isophthalic acid, 352 parts by mass of 1,3-butanediol, and 191 parts by mass of neopentyl glycol to be then subjected to esterification reaction at 190 to 220° C. under a nitrogen gas stream. Thereafter, after the predetermined water was distilled off, 124 parts by mass of adipic acid, 172 parts by mass of sebacic acid, and 0.01 parts by mass of titanium tetrabutoxide (esterification catalyst) were added thereto to be then subjected to esterification reaction at 180 to 220° C. under a nitrogen gas stream, thereby producing a polyester polyol A having a number average molecular weight of 498.

Synthetic Example 2: Synthesis of Diisocyanate Group-Terminated Prepolymer A

A reaction vessel was charged with 341 parts by mass of polyester polyol A and 648 parts by mass of xylylene diisocyanate to be then subjected to urethane reaction at 70 to 80° C. for three hours under a nitrogen gas stream. Thereafter, the unreacted xylylene diisocyanate monomer was removed by a thin film distillation, thereby producing a diisocyanate group-terminated prepolymer A (NCO-1).

Synthetic Example 3: Synthesis of Diisocyanate Group-Terminated Prepolymer B

A reaction vessel was charged with 150 parts by mass of polyester polyol A and 350 parts by mass of derivative (H8) of hexamethylene diisocyanate to be then subjected to urethane reaction at 95° C. for six hours under a nitrogen gas stream. Thereafter, 500 parts by mass of diisocyanate group-terminated prepolymer A (NCO-1) was mixed with the produced reaction product, thereby producing a diisocyanate group-terminated prepolymer B (NCO-2).

Production of Polyol Component

Production Example 1

Polyester polyol A (750 parts by mass) and 134 parts by mass of trimethylolpropane were uniformly mixed at 70° C., and 94 parts by mass of xylylene diisocyanate was added thereto to be then reacted at 80° C., thereby producing a polyurethane polyol. Subsequently, 0.1 parts by mass of phosphoric acid (manufactured by Wako Pure Chemical Industries, Ltd.) was uniformly mixed with 100 parts by mass of the polyurethane polyol at 90° C., and furthermore, 2 parts by mass of γ-glycidoxypropyltriethoxysilane (trade name: KBE403, manufactured by Shin-Etsu Chemical Co., Ltd.) and 0.2 parts by mass of 3-aminopropyltriethoxysilane (trade name: KBE903, manufactured by Shin-Etsu Chemical Co., Ltd.) were uniformly mixed at 75° C., thereby producing a polyol component OH-1.

Production Example 2

A reaction vessel was charged with 123 parts by mass of terephthalic acid, 370 parts by mass of isophthalic acid, 221 parts by mass of ethylene glycol, 62 parts by mass of neopentyl glycol, 207 parts by mass of 1,6-hexanediol, and 0.1 parts by mass of zinc acetate (esterification catalyst) to be then subjected to esterification reaction at 190 to 220° C. under a nitrogen gas stream. Thereafter, after the predetermined water was distilled off, 163 parts by mass of adipic acid was added thereto to be then subjected to esterification reaction at 180 to 220° C. under a nitrogen gas stream, thereby producing a polyester polyol having a number average molecular weight of 662. Subsequently, 0.05 parts by mass of phosphoric acid (manufactured by Wako Pure Chemical Industries, Ltd.), 1.5 parts by mass of γ-glycidoxypropyltriethoxysilane (trade name: KBE403, manufactured by Shin-Etsu Chemical Co., Ltd.), and 0.5 parts by mass of 3-aminopropyltriethoxysilane (trade name: KBE903, manufactured by Shin-Etsu Chemical Co., Ltd.) were uniformly mixed with 100 parts by mass of the polyester polyol composition at 75° C., thereby producing a polyol component OH-2.

3. Preparation of Examples and Comparative Examples

Each of the derivatives of the pentamethylene diisocyanate, each of the diisocyanate group-terminated prepolymers, and each of the polyol components obtained as described above were uniformly mixed at 70° C. in accordance with the mixing formulation shown in Tables 2 to 5, thereby preparing each of the two-component curable solventless-type laminate adhesives of Examples and Comparative Examples.

4. Evaluation

<Evaluation of Continuous Application Properties>
(Pot Life Test (Viscosity Measurement of Two-Component Curable Solventless-Type Laminate Adhesive)

In Examples 1 to 11 and Comparative Examples 1 to 11, each of the polyisocyanate components and each of the polyol components were uniformly mixed at 70° C., thereafter, the liquid mixture was stored at 70° C., and then, the viscosity of the liquid mixture after two minutes (immediately after) and after 20 minutes was measured at 70° C. The results are shown in Tables 2 to 4.

(Production of Composite Film and Measurement of Adhesive Strength)

By using a solventless laminator (manufactured by OKAZAKI MACHINE INDUSTRY CO., LTD., non-sol laminator TNS-400-200), each of the two-component curable solventless-type laminate adhesives of Examples 1 to 11 and Comparative Examples 1 to 11 was applied to the surface of an unstretched polypropylene film (thickness of 60 μm, CPP60 (RCX-22), manufactured by Mitsui Chemicals Tohcello. Inc.) (application temperature of 80° C., application amount of about 2.0 g/m$^2$).

Thereafter, the same unstretched polypropylene film was attached to the application surface thereof, thereby producing a laminate composite film. Thereafter, the laminate composite film was aged at 24° C. for 24 hours.

The adhesive strength of the unstretched polypropylene films of the laminate composite film immediately after, three hours after, eight hours after, and 24 hours after the production of the laminate composite film by bonding the above-described unstretched polypropylene films to each other was measured under the environment of 24° C., a test piece width of 100 mm, and a tensile speed of 100 mm/min by a T-type peeling test (in conformity with HS K 6854). The results are shown in Tables 2 to 4.

<Content Resistance Test>

By using each of the two-component curable solventless-type laminate adhesives of Examples 1 to 11 and Comparative Examples 1 to 11, a white printing (subjected to white solid printing (applying one liquid-type white ink twice)) nylon film (trade name: EMBLEM ON-RT, thickness: 15 μm, manufactured by UNITIKA LTD.) and a polyethylene film (trade name: TUX-FCS, thickness: 130 μm, manufactured by Mitsui Chemicals Tohcello. Inc.) were bonded to each other at an application temperature of 80° C. and an application amount of 2.5 g/m$^2$ to be aged at 40° C. for three days. The laminate film (composite film) after aging was made into a pouch (seal width of 5 to 10 mm, seal conditions: 180° C.×0.15 MPa×0.6 seconds) having a size of 65 mm×175 mm, and 30 g of stock solution of Liquid Attack (slightly alkaline synthetic detergent for washing, manufactured by Kao Corporation) as a content was put thereto to be stored at 60° C. for four weeks. The appearance of the composite film after storage was visually evaluated. The criteria of the evaluation are shown below.

Good: good
Poor: almost good (very slight orange peel-like appearance)
Bad: poor appearance of orange peel or blur
Very Bad: delamination The T-type peeling strength and the heat seal (HS) strength of the films before or after the storage were measured. The T-type peeling strength and the heat seal (HS) strength were measured with a test piece width of 15 mm, a tensile speed of 300 mm/min, and under the environment of 24° C. by a T-type peeling test (in conformity with JIS K 6854). The state of the film after the content resistance test was visually evaluated. The criteria of the evaluation are shown below.

1: ink transfer (peeling of white solid ink)
2: elongation of polyethylene film
3: peeling of nylon film and adhesive
4: aggregation and peeling of adhesive
5: cutting of nylon film
6: cutting of polyethylene film The evaluation of the content resistance test is shown in Tables 2 to 4.

TABLE 2

| | | | | Example No. | | | | | | | |
|---|---|---|---|---|---|---|---|---|---|---|---|
| | | | | Ex. 1 | Ex. 2 | Ex. 3 | Ex. 4 | Ex. 5 | Ex. 6 | Ex. 7 | Ex. 8 |
| Formulation | Polyisocyanate component | Diisocyanate Group-Terminated Prepolymer | Type | NCO-1 | NCO-1 | NCO-1 | NCO-1 | NCO-1 | NCO-1 | NCO-1 | NCO-1 |
| | | Derivative | Type | P1 | P2 | P3 | P4 | P5 | P6 | P7 | P8 |
| | | | parts by mass | 100 | 100 | 100 | 100 | 100 | 100 | 100 | 100 |
| | | | Type | | | | | | | | |
| | | | parts by mass | | | | | | | | |

TABLE 2-continued

|  |  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
|  |  | Molar Ratio of Isocyanurate Group/ Allophanate Group | mol % | 99/1 | 98/2 | 95/5 | 90/10 | 86/14 | 80/20 | 67/33 | 80/20 |
|  |  | Content Ratio of Uretdione Group | mol % | 1.8 | 1.7 | 1.0 | 0.9 | 0.8 | 0.6 | 0.7 | 0.9 |
|  |  | Viscosity at 25° C. | mPa·s | 2120 | 2000 | 1900 | 1650 | 1350 | 900 | 750 | 1400 |
|  |  | Mass Ratio of Diisocyanate Group-Terminated Prepolymer/Derivative | parts by mass | 60/40 | 60/40 | 60/40 | 60/40 | 60/40 | 60/40 | 60/40 | 60/40 |
|  | Polyol Component | | Type | OH-1 | OH-1 | OH-1 | OH-1 | OH-1 | OH-1 | OH-1 | OH-1 |
|  | Mixing Ratio of Polyisocyanate Component/Polyol Component | | Mass Ratio | 100/50 | 100/50 | 100/50 | 100/50 | 100/50 | 100/50 | 100/50 | 100/50 |
| Evaluation | Continuous Application Properties | Viscosity of Liquid Mixture from Immediately After Mixture (mPa·s/70° C.) | after 2 Minutes | 990 | 960 | 900 | 810 | 680 | 600 | 480 | 980 |
|  |  |  | after 20 minutes | 2950 | 2800 | 2610 | 2380 | 2150 | 2000 | 1850 | 2900 |
|  |  | Adhesive Strength (N/100 mm) | Immediately after | 0.05 | 0.05 | 0.06 | 0.05 | 0.05 | 0.05 | 0.04 | 0.06 |
|  |  |  | after 3 hours | 0.15 | 0.15 | 0.17 | 0.16 | 0.16 | 0.16 | 0.13 | 0.11 |
|  |  |  | after 8 hours | 1.01 | 1.06 | 1.14 | 1.10 | 1.02 | 0.97 | 0.69 | 0.98 |
|  |  |  | after 24 hours | 28.2 | 29.8 | 31.2 | 29.2 | 27.2 | 26.0 | 17.4 | 20.8 |
|  | Content Resistance Test | Immediately after Sealing (N/15 mm, [state]) | T-type | [5] | [5] | [5] | [5] | [5] | [5] | 19.0, [2] | 19.0, [2] |
|  |  |  | HS | 67, [6] | 67, [6] | 70, [6] | 70, [6] | 70, [6] | 72, [6] | 69, [6] | 69, [6] |
|  | 60° C. after 4 Weeks | Gas Layer Portion (N/15 mm, [state]) | Appearance | Good | Good | Good | Good | Good | Good | Good | Good |
|  |  |  | T-type | 3.7, [3] | 3.7, [3] | 3.8, [3] | 3.9, [3] | 4.5, [3] | 6.1, [3] | 3.3, [3] | 4.8, [3] |
|  |  |  | HS | 65, [6] | 68, [6] | 71, [6] | 69, [6] | 68, [6] | 69, [6] | 57, [6] | 60, [6] |
|  |  | Liquid Layer Portion (N/15 mm, [state]) | Appearance | Good | Good | Good | Good | Good | Good | Good | Good |
|  |  |  | T-type | 3.8, [3] | 3.9, [3] | 4.0, [3] | 4.0, [3] | 4.1, [3] | 4.3, [3] | 5.7, [3] | 5.9, [3] |
|  |  |  | HS | 57, [6] | 57, [6] | 59, [6] | 59, [6] | 55, [6] | 55, [6] | 59, [6] | 62, [6] |

TABLE 3

|  |  |  |  | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|---|---|
| Formulation | Polyisocyanate Component | Diisocyanate Group-Terminated Prepolymer | Type | NCO-1 | NCO-1 | NCO-2 | NCO-1 | NCO-1 | NCO-1 | NCO-1 |
|  |  | Derivative | Type | P3 | P3 | P3 | P9 | P10 | P9 | P11 |
|  |  |  | parts by mass | 98 | 94 | 100 | 100 | 100 | 40 | 100 |
|  |  |  | Type | P12 | P12 |  |  |  | P11 |  |
|  |  |  | parts by mass | 2 | 6 |  |  |  | 60 |  |
|  |  | Molar Ratio of Isocyanurate Group/ Allophanate Group | mol % | 95/5 | 95/5 | 95/5 | 100/0 | 56/44 | 40/60 | 0/100 |
|  |  | Content Ratio of Uretdione Group | mol % | 3.0 | 7.0 | 1.0 | 2.0 | 0.8 | 0.6 | 1.3 |
|  |  | Viscosity at 25° C. | mPa·s | 1850 | 1790 | 1900 | 2250 | 500 | 380 | 100 |

TABLE 3-continued

|  |  |  |  | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|---|---|
|  |  | Mass Ratio of Diisocyanate Group-Terminated Prepolymer/Derivative | parts by mass | 60/40 | 60/40 | 60/40 | 60/40 | 60/40 | 60/40 | 60/40 |
|  |  | Polyol Component | Type | OH-1 | OH-1 | OH-1 | OH-1 | OH-1 | OH-1 | OH-1 |
|  |  | Mixing Ratio of Polyisocyanate Component/Polyol Component | Mass Ratio | 100/50 | 100/50 | 100/50 | 100/50 | 100/50 | 100/50 | 100/50 |
| Evaluation | Continuous Application Properties | Viscosity of Liquid Mixture from Immediately after Mixture (mPa·s/70° C.) | after 2 Minutes | 890 | 860 | 1440 | 1150 | 380 | 360 | 390 |
|  |  |  | after 20 Minutes | 2600 | 2590 | 3880 | 3100 | 1800 | 1500 | 1000 |
|  |  | Adhesive Strength (N/100 mm) | Immediately after | 0.05 | 0.06 | 0.05 | 0.05 | 0.04 | 0.03 | 0.02 |
|  |  |  | after 3 hours | 0.14 | 0.13 | 0.15 | 0.13 | 0.11 | 0.08 | 0.03 |
|  |  |  | after 8 hours | 1.05 | 0.99 | 1.10 | 0.92 | 0.44 | 0.35 | 0.12 |
|  |  |  | after 24 hours | 28.9 | 24.8 | 29.0 | 22.0 | 11.9 | 8.5 | 4.0 |
|  | Content Resistance Test | Immediately after Sealing (N/15 mm, [state]) | T-type | [5] | 19.0, [2] | [5] | [5] | 19.0, [2] | [5] | 17.5, [2] |
|  |  |  | HS | 65, [6] | 70, [6] | 70, [6] | 69, [6] | 67, [6] | 75, [6] | 73, [6] |
|  | 60° C. after 4 Weeks | Gas Layer Portion (N/15 mm, [state]) | Appearance | Good | Good | Good | Good | Good | Good | Good |
|  |  |  | T-type | 3.8, [3] | 3.5, [3] | 3.5, [3] | 4.3, [3] | 5.7, [3] | [5] | 2.6, [4] |
|  |  |  | HS | 67, [6] | 55, [6] | 71, [6] | 70, [6] | 70, [6] | 63, [6] | 47 |
|  |  | Liquid Layer Portion (N/15 mm, [state]) | Appearance | Good | Good | Good | Good | Good | Good | Good |
|  |  |  | T-type | 4.0, [3] | 3.8, [3] | 4.0, [3] | 3.9, [3] | 5.1, [3] | 17.5, [2][3] | [5] |
|  |  |  | HS | 56, [6] | 59, [6] | 60, [6] | 55, [6] | 55, [6] | 69, [6] | 48 |

TABLE 4

|  |  |  |  |  | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Formulation | Polyisocyanate Component | Diisocyanate Group-Terminated Prepolymer | | Type | NCO-1 | NCO-1 | NCO-1 | NCO-1 | NCO-1 | NCO-1 | NCO-1 |
|  |  | Derivative | | Type | H1 | H2 | H3 | H4 | H5 | H6 | H7 |
|  |  |  | | parts by mass | 100 | 100 | 100 | 100 | 100 | 100 | 100 |
|  |  |  | | Type |  |  |  |  |  |  |  |
|  |  |  | | parts by mass |  |  |  |  |  |  |  |
|  |  |  | Molar Ratio of Isocyanurate Group/Allophanate Group | mol % | 99/1 | 98/2 | 95/5 | 90/10 | 85/15 | 80/20 | 70/30 |
|  |  |  | Content Ratio of Uretdione Group | mol % | 2.0 | 1.9 | 1.8 | 1.1 | 1.0 | 0.9 | 0.9 |
|  |  |  | Viscosity at 25° C. | mPa·s | 2800 | 2620 | 2430 | 2100 | 1430 | 1200 | 760 |
|  |  | Mass Ratio of Diisocyanate Group-Terminated Prepolymer/Derivative | | parts by mass | 60/40 | 60/40 | 60/40 | 60/40 | 60/40 | 60/40 | 60/40 |
|  |  | Polyol Component | | Type | OH-1 | OH-1 | OH-1 | OH-1 | OH-1 | OH-1 | OH-1 |
|  |  | Mixing Ratio of Polyisocyanate Component/Polyol Component | | Mass Ratio | 100/50 | 100/50 | 100/50 | 100/50 | 100/50 | 100/50 | 100/50 |
| Evaluation | Continuous Application Properties | Viscosity of Liquid Mixture from Immediately after Mixture (mPa·s/70° C.) | | after 2 Minutes | 1700 | 1680 | 1650 | 1310 | 1120 | 910 | 600 |
|  |  |  | | after 20 Minutes | 4120 | 4080 | 4030 | 3450 | 2850 | 2340 | 2200 |
|  |  | Adhesive Strength (N/100 mm) | | Immediately after | 0.06 | 0.06 | 0.06 | 0.06 | 0.05 | 0.05 | 0.05 |
|  |  |  | | after 3 hours | 0.18 | 0.18 | 0.17 | 0.16 | 0.15 | 0.15 | 0.13 |
|  |  |  | | after 8 hours | 0.90 | 0.90 | 0.86 | 0.72 | 0.68 | 0.65 | 0.58 |
|  |  |  | | after 24 hours | 20.5 | 20.2 | 19.8 | 19.2 | 18.4 | 17.2 | 13.8 |
|  | Content Resistance Test | Immediately after Sealing (N/15 mm, [state]) | | T-type | [5] | [5] | [5] | [5] | 19.5, [2] | 19.5, [2] | 19.5, [2] |
|  |  |  | | HS | 60, [6] | 62, [6] | 66, [6] | 70, [6] | 66, [6] | 60, [6] | 59, [6] |
|  | 60° C. after 4 Weeks | Gas Layer Portion (N/15 mm, [state]) | | Appearance | Good | Good | Good | Good | Good | Good | Good |
|  |  |  | | T-type | 4.0, [3] | 4.2, [3] | 4.0, [3] | 3.9, [3] | 5.2, [3] | 5.5, [3] | 5.7, [3] |
|  |  |  | | HS | 72, [6] | 69, [6] | 70, [6] | 68, [6] | 64, [6] | 66, [6] | 66, [6] |

TABLE 4-continued

|  |  | Comparative Example No. | | | | | | |
|---|---|---|---|---|---|---|---|---|
|  |  | Comp. Ex. 5 | Comp. Ex. 6 | Comp. Ex. 7 | Comp. Ex. 8 | Comp. Ex. 9 | Comp. Ex. 10 | Comp. Ex. 11 |
| Liquid Layer Portion (N/15 mm, [state]) | Appearance | Good | Good | Good | Good | Good | Good | Good |
|  | T-type | 3.9, [3] | 4.0, [3] | 3.9, [3] | 3.9, [3] | 3.3, [3] | 3.5, [3] | 3.5, [3] |
|  | HS | 59, [6] | 62, [6] | 60, [6] | 66, [6] | 63, [6] | 61, [6] | 60, [6] |

<Description of Abbreviations and Designations in Tables 2 to 4>
NCO-1: diisocyanate group-terminated prepolymer A
NCO-2: diisocyanate group-terminated prepolymer B
OH-1: polyurethane polyol <Retort Test>

Each of the two-component curable solventless-type laminate adhesives (application temperature: 80° C., application amount: 3.0 g/m²) (hereinafter, may be abbreviated as an adhesive) of Examples 12 to 14 and Comparative Examples 12 to 17 was applied to an aluminum surface of a primary laminate composite film in which a polyethylene terephthalate film (ester film, E5102, thickness: 12 μm, manufactured by TOYOBO CO., LTD.) and an aluminum foil (soft aluminum, thickness: 9 μm, manufactured by TOYO ALUMINIUM K.K.) were bonded to each other in advance with a different solvent adhesive (application temperature: 24° C., application amount: 3.0 g/m²) to be bonded to a polypropylene film (RXC-22, thickness: 60 μm, manufactured by Mitsui Chemicals Tohcello. Inc.). After being aged at 40° C. for three days, a pouch (seal width of 5 to 10 mm, seal conditions: 210° C.×0.15 MPa×0.6 seconds) having a size of 130 mm×175 mm was produced, and 150 g of mixed sauce (volume ratio: 1 to 1 to 1) of vinegar (grain vinegar manufactured by Mizkan Holdings Co., Ltd.), vegetable oil (salad oil manufactured by The Nisshin OilliO Group, Ltd.), and ketchup (tomato ketchup manufactured by KAGOME CO., Ltd.) as a content was put thereto. The resulting pouch was left to stand at 121° C. for 30 minutes to be subjected to retort treatment with a hot water circulating retort device. The T-type peeling strength and the heat seal (HS) strength were measured before or after the retort treatment. The T-type peeling strength and the heat seal (HS) strength were measured with a test piece width of 15 mm, a tensile speed of 300 mm/min, and under the environment of 24° C. by a T-type peeling test (in conformity with HS K 6854). The state of the appearance after the retort treatment was visually evaluated. The criteria of the evaluation are shown below.

(Evaluation of T-Type Peeling Strength)
1: peeling of aluminum foil and adhesive
2: peeling of polypropylene film and adhesive
(Evaluation of Appearance)
Good: no peeling
Poor: partially peeling
Bad: completely peeling The evaluation of the retort test is shown in Table 5.

TABLE 5

|  |  |  |  | Example No./Comparative Example No. | | | | | | | | |
|---|---|---|---|---|---|---|---|---|---|---|---|---|
|  |  |  |  | Ex. 12 | Ex. 13 | Ex. 14 | Comp. Ex. 12 | Comp. Ex. 13 | Comp. Ex. 14 | Comp. Ex. 15 | Comp. Ex. 16 | Comp. Ex. 17 |
| Formulation | Polyisocyanate Component (Derivative) | Type | | P3 | P6 | P7 | P9 | P10 | P9 | P11 | H3 | H7 |
|  |  | parts by mass | | 100 | 100 | 100 | 100 | 100 | 40 | 100 | 100 | 100 |
|  |  | Type | | | | | | | P5 | | | |
|  |  | parts by mass | | | | | | | 60 | | | |
|  |  | Molar Ratio of Isocyanurate Group/ Allophanate Group | mol % | 95/5 | 80/20 | 67/33 | 100/0 | 56/44 | 40/60 | 0/100 | 95/5 | 70/30 |
|  |  | Content Ratio of Uretdione Group | mol % | 1.0 | 0.6 | 0.7 | 2.0 | 0.8 | 0.6 | 1.3 | 1.8 | 0.9 |
|  |  | Viscosity at 25° C. | mPa · s | 1900 | 900 | 750 | 2250 | 500 | 380 | 100 | 2430 | 760 |
|  | Polyol Component | Type | | OH-2 | OH-2 | OH-2 | OH-2 | OH-2 | OH-2 | OH-2 | OH-2 | OH-2 |
|  | Mixing Ratio of Polyol Component/ Polyisocyanate Component | Mass Ratio | | 100/63 | 100/66 | 100/68 | 100/63 | 100/72 | 100/71 | 100/76 | 100/74 | 100/69 |
| Evaluation | Retort Test | Before Test | T-type (N/15 mm, [state]) | 4.1, [1] | 4.5, [1] | 5.2, [1] | 4.0, [1] | 6.0, [1] | 6.0, [1] | 14, [2] | 3.8, [1] | 4.7, [1] |
|  |  |  | HS (N/15 mm) | 40 | 41 | 40 | 38 | 42 | 45 | 49 | 39 | 41 |
|  |  | After Test | T-type (N/15 mm, [state]) | 2.1, [1] | 2.1, [1] | 2.4, [1] | 2.2, [1] | 2.5, [1] | 2.4, [1] | 5.5, [1] | 1.9, [1] | 2.4, [1] |
|  |  |  | HS (N/15 mm) | 33 | 33 | 32 | 33 | 30 | 24 | 27 | 34 | 34 |
|  |  |  | Appearance | Good | Good | Good | Good | Good | Good | Poor | Good | Good |

<Description of Abbreviations and Designations in Table 5>
OH-2: polyester polyol 5. Consideration It is shown that compared to the two-component curable solventless-type laminate adhesive containing the derivative of the hexamethylene diisocyanate, the viscosity of the two-component curable solventless-type laminate adhesive containing the derivative of the pentamethylene diisocyanate in the polyisocyanate component in two minutes after the mixture of the polyisocyanate component and the polyol component, and the viscosity thereof in 20 minutes after the mixture are generally low, and also, the adhesive strength developed in 24 hours after the mixture is generally large.

In particular, in the polyisocyanate component, when the content ratio of the allophanate group is less than that of the isocyanurate group, particularly, when the molar ratio of the isocyanurate group/the allophanate group is 80/20 (mol %) or more, among all, 90/10 (mol %) or more, the adhesive strength of the two-component curable solventless-type laminate adhesive containing the derivative of the pentamethylene diisocyanate in the polyisocyanate component with respect to the two-component curable solventless-type laminate adhesive containing the derivative of the hexamethylene diisocyanate is large.

Furthermore, in the two-component curable solventless-type laminate adhesive containing the derivative of the pentamethylene diisocyanate, as confirmed in Examples 1 to 6, while the maximum value of the adhesive strength is in the neighborhood of the molar ratio of the isocyanurate group/allophanate group of 95/5 (mol %), in the two-component curable solventless-type laminate adhesive containing the derivative of the hexamethylene diisocyanate, as confirmed in Comparative Examples 5 to 10, even when the content ratio of the isocyanurate group increases, the adhesive strength only gradually increases as the content ratio of the isocyanurate group increases.

Thus, it is shown that a large difference in the tendency of the adhesive strength occurs between a case where the derivative of the pentamethylene diisocyanate is contained in the polyisocyanate component and a case where the derivative of the hexamethylene diisocyanate is contained therein because of a difference in the content ratio of the isocyanurate group (or the allophanate group) in the two-component curable solventless-type laminate adhesive.

It is also shown that the use of the two-component curable solventless-type laminate adhesive containing the derivative of the pentamethylene diisocyanate in the polyisocyanate component has the same content resistance and retort resistance as the use of the two-component curable solventless-type laminate adhesive containing the derivative of the hexamethylene diisocyanate.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The two-component curable solventless-type laminate adhesive of the present invention can be, for example, used in refill standing pouches and various packages in the toiletry field, packages of retort food and dried food, packages of pharmaceutical products, electronic and electric components, cell members such as solar cell and fuel cell, living materials such as shopping bags, book covers, and stickers, and construction and industry materials such as decorative sheets.

The invention claimed is:

1. A two-component curable solventless-type laminate adhesive comprising:
   a polyisocyanate component and a polyol component, wherein
   the polyisocyanate component contains
   a derivative of a pentamethylene diisocyanate and a polyisocyanate group-terminated prepolymer derived from an araliphatic diisocyanate,
   the derivative of the pentamethylene diisocyanate contains an isocyanurate group and an allophanate group,
   the content ratio of the isocyanurate group with respect to 100 moles of the total amount of the isocyanurate group and the allophanate group is 90 moles or more and 98 moles or less,
   the polyol component contains a polyester polyol or a polyurethane polyol, and
   the equivalent ratio of an isocyanate group of the polyisocyanate component with respect to a hydroxyl group of the polyol component is 0.3 or more and 3.0 or less.

2. The two-component curable solventless-type laminate adhesive according to claim 1,
   wherein the allophanate group is derived from the pentamethylene diisocyanate and a monohydric alcohol.

3. The two-component curable solventless-type laminate adhesive according to claim 1,
   wherein the polyisocyanate component contains a diisocyanate group-terminated prepolymer that is a reaction product of a diisocyanate containing an araliphatic diisocyanate and a diol containing a high molecular weight diol having a number average molecular weight of 300 or more and 2000 or less.

4. The two-component curable solventless-type laminate adhesive according to claim 1,
   wherein the viscosity thereof at 70° C. in 2 minutes after mixture of the polyisocyanate component and the polyol component is 400 mPa·s or more and 1600 mPa·s or less.

5. The two-component curable solventless-type laminate adhesive according to claim 1,
   wherein the viscosity thereof at 70° C. in 20 minutes after mixture of the polyisocyanate component and the polyol component is 4000 mPa·s or less.

6. A resin cured product being:
   a cured product of the two-component curable solventless-type laminate adhesive according to claim 1.

* * * * *